("(12) United States Patent  
Edwards et al.

(10) Patent No.: US 9,621,681 B2  
(45) Date of Patent: *Apr. 11, 2017

(54) HIERARCHICAL TEMPORAL MEMORY (HTM) SYSTEM DEPLOYED AS WEB SERVICE

(71) Applicant: Numenta, Inc., Redwood City, CA (US)

(72) Inventors: Jeffrey L. Edwards, Menlo Park, CA (US); Wiliam C. Saphir, San Francisco, CA (US); Subutai Ahmad, Palo Alto, CA (US); Dileep George, Mountain View, CA (US); Frank Astier, Mountain View, CA (US); Ronald Marianetti, Campbell, CA (US)

(73) Assignee: Numenta, Inc., Redwood City, CA (US)

( * ) Notice: Subject to any disclaimer, the term of this patent is extended or adjusted under 35 U.S.C. 154(b) by 458 days.

This patent is subject to a terminal disclaimer.

(21) Appl. No.: 14/228,121

(22) Filed: Mar. 27, 2014

(65) Prior Publication Data

US 2014/0207842 A1    Jul. 24, 2014

Related U.S. Application Data

(63) Continuation of application No. 13/415,713, filed on Mar. 8, 2012, now Pat. No. 8,732,098, which is a  
(Continued)

(51) Int. Cl.  
*G06N 3/04* (2006.01)  
*H04L 29/06* (2006.01)  
(Continued)

(52) U.S. Cl.  
CPC .......... *H04L 67/42* (2013.01); *G06K 9/00979* (2013.01); *G06N 3/04* (2013.01);  
(Continued)

(58) Field of Classification Search  
None  
See application file for complete search history.

(56) References Cited

U.S. PATENT DOCUMENTS 4,766,534 A    8/1988  DeBenedictis  
4,845,744 A    7/1989  DeBenedictis  
(Continued)

FOREIGN PATENT DOCUMENTS

EP         1 557 990           7/2005  
WO    WO 2006/063291           6/2006  
(Continued)

OTHER PUBLICATIONS

Bobier, et al., Content-Based Image Retrieval Using Hierarchical Temporal Memory, Proceedings of the 16th International Conference on Multimedia 2008, 2008, pp. 925-928.*

(Continued)

*Primary Examiner* — Wilbert L Starks  
(74) *Attorney, Agent, or Firm* — Fenwick & West LLP

(57)    ABSTRACT

A web-based hierarchical temporal memory (HTM) system in which one or more client devices communicate with a remote server via a communication network. The remote server includes at least a HTM server for implementing a hierarchical temporal memory (HTM). The client devices generate input data including patterns and sequences, and send the input data to the remote server for processing. The remote server (specifically, the HTM server) performs processing in order to determine the causes of the input data, and sends the results of this processing to the client devices. The client devices need not have processing and/or storage  
(Continued)

capability for running the HTM but may nevertheless take advantage of the HTM by submitting a request to the HTM server.

20 Claims, 6 Drawing Sheets

Related U.S. Application Data continuation-in-part of application No. 12/029,434, filed on Feb. 11, 2008, now abandoned, said application No. 13/415,713 is a continuation-in-part of application No. 12/576,966, filed on Oct. 9, 2009, now Pat. No. 8,285,667, which is a continuation of application No. 11/622,454, filed on Jan. 11, 2007, now Pat. No. 7,620,608, which is a continuation of application No. 11/351,437, filed on Feb. 10, 2006, now abandoned.

(60) Provisional application No. 60/904,761, filed on Feb. 28, 2007, provisional application No. 60/771,990, filed on Feb. 10, 2006.

(51) Int. Cl.
  *H04L 12/58*  (2006.01)
  *G06K 9/00*  (2006.01)
  *H04L 29/08*  (2006.01)
  *G06N 3/08*  (2006.01)

(52) U.S. Cl.
  CPC ............ *H04L 12/585* (2013.01); *H04L 51/12* (2013.01); *H04L 67/02* (2013.01); *H04L 67/1017* (2013.01); *H04L 67/1097* (2013.01); *G06N 3/08* (2013.01)

(56) References Cited

U.S. PATENT DOCUMENTS

| | | | |
|---|---|---|---|
| 5,255,348 A | 10/1993 | Nenov | |
| 5,712,953 A | 1/1998 | Langs | |
| 5,729,661 A | 3/1998 | Keeler et al. | |
| 5,761,389 A | 6/1998 | Maeda et al. | |
| 6,028,608 A | 2/2000 | Jenkins | |
| 6,122,014 A | 9/2000 | Panusopone et al. | |
| 6,144,711 A | 11/2000 | Raleigh et al. | |
| 6,195,622 B1 | 2/2001 | Altschuler et al. | |
| 6,353,814 B1 | 3/2002 | Weng | |
| 6,366,896 B1 | 4/2002 | Hutchison | |
| 6,400,996 B1 | 6/2002 | Hoffberg et al. | |
| 6,468,069 B2 | 10/2002 | Lemelson et al. | |
| 6,567,814 B1 | 5/2003 | Bankier et al. | |
| 6,615,211 B2 | 9/2003 | Beygelzimer et al. | |
| 6,625,585 B1 | 9/2003 | MacCuish et al. | |
| 6,714,941 B1 | 3/2004 | Lerman et al. | |
| 6,751,343 B1 | 6/2004 | Ferrell et al. | |
| 6,882,992 B1 | 4/2005 | Werbos | |
| 6,957,241 B2 | 10/2005 | George | |
| 7,088,693 B2 | 8/2006 | George | |
| 7,251,637 B1 | 7/2007 | Caid et al. | |
| 7,613,675 B2 | 11/2009 | Hawkins et al. | |
| 7,620,608 B2 | 11/2009 | Jaros et al. | |
| 7,624,085 B2 | 11/2009 | Hawkins et al. | |
| 7,676,458 B2 | 3/2010 | Aggarwal et al. | |
| 7,739,208 B2 | 6/2010 | George et al. | |
| 7,826,990 B2 | 11/2010 | Nasle et al. | |
| 7,840,395 B2 | 11/2010 | Nasle et al. | |
| 7,840,396 B2 | 11/2010 | Radibratovic et al. | |
| 7,844,439 B2 | 11/2010 | Nasle et al. | |
| 7,844,440 B2 | 11/2010 | Nasle et al. | |
| 7,899,775 B2 | 3/2011 | George et al. | |
| 7,904,412 B2 | 3/2011 | Saphir et al. | |
| 7,937,342 B2 | 5/2011 | George et al. | |
| 7,941,389 B2 | 5/2011 | Marianetti, II et al. | |
| 7,941,392 B2 | 5/2011 | Saphir | |
| 7,983,998 B2 | 7/2011 | George et al. | |
| 8,037,010 B2 | 10/2011 | Jaros et al. | |
| 8,102,423 B2 | 1/2012 | Cheng | |
| 8,103,603 B2 | 1/2012 | George et al. | |
| 8,112,367 B2 | 2/2012 | George et al. | |
| 8,121,961 B2 | 2/2012 | George et al. | |
| 8,175,981 B2 | 5/2012 | Hawkins et al. | |
| 8,175,984 B2 | 5/2012 | George | |
| 8,175,985 B2 | 5/2012 | Sayfan et al. | |
| 8,195,582 B2 | 6/2012 | Niemasik et al. | |
| 8,219,507 B2 | 7/2012 | Jaros et al. | |
| 8,285,667 B2 | 10/2012 | Jaros et al. | |
| 8,290,886 B2 | 10/2012 | George et al. | |
| 8,732,098 B2 * | 5/2014 | Ahmad ................ | H04L 12/585 706/12 |
| 2002/0002688 A1 | 1/2002 | Gregg et al. | |
| 2002/0038294 A1 | 3/2002 | Matsugu | |
| 2002/0150044 A1 | 10/2002 | Wu et al. | |
| 2002/0161736 A1 | 10/2002 | Beygelzimer et al. | |
| 2003/0069002 A1 | 4/2003 | Hunter et al. | |
| 2003/0105597 A1 | 6/2003 | Tsui et al. | |
| 2003/0123732 A1 | 7/2003 | Miyazaki et al. | |
| 2003/0149676 A1 | 8/2003 | Kasabov | |
| 2003/0167111 A1 | 9/2003 | Kipersztok et al. | |
| 2004/0002838 A1 | 1/2004 | Oliver et al. | |
| 2004/0015459 A1 | 1/2004 | Jaeger | |
| 2004/0142325 A1 | 7/2004 | Mintz et al. | |
| 2004/0148520 A1 | 7/2004 | Talpade et al. | |
| 2004/0267395 A1 | 12/2004 | Discenzo et al. | |
| 2005/0002572 A1 | 1/2005 | Saptharishi et al. | |
| 2005/0028033 A1 | 2/2005 | Kipersztok et al. | |
| 2005/0063565 A1 | 3/2005 | Nagaoka et al. | |
| 2005/0190990 A1 | 9/2005 | Burt et al. | |
| 2005/0203773 A1 | 9/2005 | Soto et al. | |
| 2005/0222811 A1 | 10/2005 | Jakobson et al. | |
| 2006/0093188 A1 | 5/2006 | Blake et al. | |
| 2006/0098886 A1 | 5/2006 | De Haan | |
| 2006/0155660 A1 | 7/2006 | Koshizen et al. | |
| 2006/0161736 A1 | 7/2006 | Huang | |
| 2006/0184462 A1 | 8/2006 | Hawkins | |
| 2006/0212444 A1 | 9/2006 | Handman et al. | |
| 2006/0235320 A1 | 10/2006 | Tan et al. | |
| 2006/0248026 A1 | 11/2006 | Aoyama et al. | |
| 2006/0248073 A1 | 11/2006 | Jones et al. | |
| 2006/0253491 A1 | 11/2006 | Gokturk et al. | |
| 2006/0259163 A1 | 11/2006 | Hsiung et al. | |
| 2007/0005531 A1 | 1/2007 | George et al. | |
| 2007/0019754 A1 | 1/2007 | Raleigh et al. | |
| 2007/0192264 A1 | 8/2007 | Hawkins et al. | |
| 2007/0192267 A1 | 8/2007 | Hawkins et al. | |
| 2007/0192268 A1 | 8/2007 | Hawkins et al. | |
| 2007/0192269 A1 | 8/2007 | Saphir et al. | |
| 2007/0192270 A1 | 8/2007 | Hawkins et al. | |
| 2007/0228703 A1 | 10/2007 | Breed | |
| 2007/0276744 A1 | 11/2007 | Burke | |
| 2007/0276774 A1 | 11/2007 | Ahmad et al. | |
| 2008/0059389 A1 | 3/2008 | Jaros et al. | |
| 2008/0140593 A1 | 6/2008 | George et al. | |
| 2008/0183647 A1 | 7/2008 | Hawkins et al. | |
| 2008/0201286 A1 | 8/2008 | Hawkins et al. | |
| 2008/0208783 A1 | 8/2008 | Jaros et al. | |
| 2008/0208915 A1 | 8/2008 | George et al. | |
| 2008/0208966 A1 | 8/2008 | Edwards et al. | |
| 2009/0006289 A1 | 1/2009 | Jaros et al. | |
| 2009/0116413 A1 | 5/2009 | George | |
| 2009/0150311 A1 | 6/2009 | George | |
| 2009/0240886 A1 | 9/2009 | Sayfan et al. | |
| 2009/0313193 A1 | 12/2009 | Hawkins et al. | |
| 2010/0049677 A1 | 2/2010 | Jaros et al. | |
| 2010/0185567 A1 | 7/2010 | Niemasik et al. | |
| 2010/0191684 A1 | 7/2010 | George et al. | |
| 2010/0207754 A1 | 8/2010 | Shostak et al. | |
| 2011/0225108 A1 | 9/2011 | Hawkins et al. | |
| 2011/0231351 A1 | 9/2011 | George et al. | |
| 2012/0005134 A1 | 1/2012 | Jaros et al. | |
| 2012/0197823 A1 | 8/2012 | Hawkins et al. | |

(56) References Cited

U.S. PATENT DOCUMENTS

FOREIGN PATENT DOCUMENTS

WO  WO 2008/067326  6/2008
WO  WO 2009/006231  1/2009

OTHER PUBLICATIONS

Adelson, E.H. et al., "The Perception of Shading and Reflectance," Perception as Bayesian Inference, 1996, pp. 409-423, Knill, D.C. et al., eds., Cambridge University Press, UK.
Agrawal, R. et al., "Mining Sequential Patterns," IEEE, 1995, pp. 3-14.
Ahmad, S. et al., "PowerNuPIC," Numenta, Jun. 2008, Numenta HTM Workshop, Jun. 23-24, 2008, SRI Campus, Menlo Park, CA, fifty-six pages.
Ahmad, S., "NuPIC—Part II," Numenta, May 2008, Numenta HTM Workshop, Jun. 23-24, 2008, SRI Campus, Menlo Park, CA, thirty-three pages.
Archive of "Numenta Platform for Intelligent Computing Programmer's Guide," Numenta, Mar. 7, 2007, pp. 1-186, www.numenta.com, [Online] Archived by http://archive.org on Mar. 19, 2007; Retrieved on Aug. 13, 2008. Retrieved from the Internet<URL:http://web.archive.org/web/20070319232606/http://www.nume-nta.com/for-developers/softare/pdf/nupic.sub.--prog.sub.--guide.pdf>.
Becerra, J.A. et al., "Multimodule Artificial Neural Network Architectures for Autonomous Robot Control Through Behavior Modulation," IWANN 2003, LNCS, pp. 169-176, vol. 2687.
Biancaniello, P. et al., Multimodal Pattern Recognition with Hierarchical Temporal Memory (MPR), Lockheed Martin Brain-Inspired Computing Research Overview, Numenta HTM Workshop, Jun. 2008, twelve pages.
Bobier, B., "Content-Based Image Retrieval Using Hierarchical Temporal Memory," Numenta HTM Workshop, Jun. 23-24, 2008, SRI Campus, Menlo Park, CA, seven pages.
Bryhni et al., "A Comparison of Load Balancing Ttechniques for Scalable Web Servers," IEEE Network, Jul./Aug. 2000, pp. 58-64.
Ceisel, A. et al., "Using HTM Networks to Decode Neural Signals from the Motor Cortex: A Novel Approach to Brain-Computer Interface Control," Illinois Institute of Technology, Numenta HTM Workshop, 2009, four pages.
Chapela, V., "Preventing Financial Fraud," Smart Security Services, Numenta HTM Workshop, 2009, forty pages.
Chinese Office Action, Chinese Application No. 200780007274.1, Jun. 24, 2011, five pages.
Chinese Office Action, Chinese Application No. 200580042258.7, Jul. 10, 2009, twelve pages.
Colombe, J., "A Survey of Recent Developments in Theoretical Neuroscience and Machine Vision," Proceedings of the IEEE Applied Imagery Pattern Recognition Workshop, 2003, nine pages.
Cormack, G.V. et al., "Data Compression Using Dynamic Markov Modelling," The Computer Journal, 1987, pp. 541-550, vol. 30, No. 6.
Csapo, A.B. et al., "Object Categorization Using VFA-Generated Nodemaps and Hierarchical Temporal Memories," IEEE International Conference on Computational Cybernetics, Oct. 7, 2007, pp. 257-262.
Curry, C. et al., "Speech Processing with HTM," Numenta HTM Workshop, Jun. 23-24, 2008, SRI Campus, Menlo Park, CA, fifty-seven pages.
Dean, T., "Learning Invariant Features Using Inertial Priors," Annals of Mathematics and Artificial Intelligence, 2006, pp. 223-250, vol. 47.
Demeris, Y. et al., "From Motor Babbling to Hierarchical Learning by Imitation: A Robot Developmental Pathway," Proceedings of the Fifth International Workshop on Epigenetic Robotics: Modeling Cognitive Development in Robotic Systems, 2005, pp. 31-37.

Dimitrova, N. et al., "Motion Recovery for Video Content Classification," ACM Transactions on Information Systems, Oct. 1995, pp. 408-439, vol. 13, No. 4.
Ding, C.H.Q., "Cluster Merging and Splitting in Hierarchical Clustering Algorithms," Proceedings of the 2002 IEEE International Conference on Data Mining (ICDM 2002), Dec. 9, 2002, pp. 139-146.
Dolin, R. et al., "Scalable Collection Summarization and Selection," Association for Computing Machinery, 1999, pp. 49-58.
Dubinsky, D., "Numenta Business Strategy," Numenta, Jun. 2008, Numenta HTM Workshop, Jun. 23-24, 2008, SRI Campus, Menlo Park, CA, fifteen pages.
Dudgeon, M. et al., "Evolved HTM Preprocessing," Qualia Labs, Jun. 25, 2009, nine pages.
Eastman, K. "HTM's & Airline Passenger Behavior: Prediction and Inference Model," Numenta HTM Workshop, 2009, ten pages.
Edsa, "Project Information," Apr. 2008, Numenta HTM Workshop, Jun. 23-24, 2008, SRI Campus, Menlo Park, CA, four pages.
Eswaran, K., "Numenta Lightning Talk on Dimension Reduction and Unsupervised Learning," Numenta HTM Workshop, Jun. 23-24, 2008, SRI Campus, Menlo Park, CA, thirty pages.
European Patent Office, Examination Report, European Application No. 05853611.1, Jun. 23, 2008, four pages.
European Patent Office, Examination Report, European Application No. 07750385.2, Apr. 21, 2009, eight pages.
European Patent Office, Examination Report, European Patent Application No. 08796030.8, Dec. 6, 2010, seven pages.
European Patent Office, Examination Report European Patent Application No. 07750385.2, Dec. 6, 2010, eight pages.
Farahmand, N. et al., "Online Temporal Pattern Learning," Proceedings of the International Joint Conference on Neural Networks, Jun. 14-19, 2009, pp. 797-802, Atlanta, GA, USA.
Felleman, D.J. et al., "Distributed Hierarchical Processing in the Primate Cerebral Cortex," Cerebral Cortex, Jan./Feb. 1991, pp. 1-47, vol. 1.
Fine, S. et al., "The Hierarchical Hidden Markov Model: Analysis and Applications," Machine Learning, 1998, pp. 41-62, vol. 32, Kluwer Academic Publishers, Boston.
Finley, M., "Exploration of Motion Capture," Qualia Labs, Jun. 24, 2008, Numenta HTM Workshop, Jun. 23-24, 2008, SRI Campus, Menlo Park, CA, thirty-six pages.
Foldiak, P., "Learning Invariance from Transformation Sequences," Neural Computation, 1991, pp. 194-200, vol. 3, No. 2.
Fukushima, K., "Neocognitron: A Self-Organizing Neural Network Model for a Mechanism of Pattern Recognition Unaffected by Shift in Position," Biol. Cybernetics, 1980, pp. 193-202, vol. 36.
Garalevicius, S., "Memory-Prediction Framework for Pattern Recognition: Performance and Suitability of the Bayesian Model of Visual Cortex," American Association of Artificial Intelligence, 2007, six pages.
George, D. "Thesis: How the Brain Might Work," Dept. of Electrical Engineering and the Committee on Graduate Studies of Stanford University, Jun. 2008, one-hundred ninety-one pages.
George, D. et al., "A Hierarchical Bayesian Model of Invariant Pattern Recognition in the Visual Cortex," Mar. 2005.
George, D. et al., "Invariant Pattern Recognition Using Bayesian Inference on Hierarchical Sequences," Technical Report, Sep. 17, 2004, pp. 1-8.
George, D. et al., "The HTM Learning Algorithms," Mar. 1, 2007, 44 pages. [Online] [Retrieved on Sep. 22, 2011] Retrieved from the Internet <URL:http://www.numenta.com/htm-overview/education/Numenta._HTM_Learning._Algos.pdf.>.
George, D. et al., "Towards a Mathematical Theory of Cortical Micro-circuits," PLoS Computational Biology, Oct. 2009, vol. 5, Issue 10, twenty-six pages.
George, D. et al., "Invariant Pattern Recognition Using Bayesian Inference on Hierarchical Sequences," Oct. 2004, eight pages.
George, D. et al., "A Hierarchical Bayesian Model of Invariant Pattern Recognition in the Visual Cortext," Proceedings of 2005 IEEE International Joint Conference on Neural Networks, Jul. 31-Aug. 4, 2005, pp. 1812-1817, vol. 3.
Gottschalk, K. et al., "Introduction to Web Services Architecture," IBM Systems Journal, 2002, pp. 170-177, vol. 41, No. 2.

(56) References Cited

OTHER PUBLICATIONS

Guerrier, P., "A Generic Architecture for On-Chip Packet-Switched Interconnections," Association for Computing Machinery, 2000, pp. 250-256.

Guinea, D. et al., "Robot Learning to Walk: An Architectural Problem for Intelligent Controllers," Proceedings of the 1993 International Symposium on Intelligent Control, Aug. 1993, pp. 493-498, Chicago, USA.

Guo, C-E. et al., "Modeling Visual Patterns by Integrating Descriptive and Generative Methods," International Journal of Computer Vision, May 29, 2003, pp. 5-29, vol. 53, No. 1.

Haitani, R. et al., "Vitamin D Toolkit, Introduction," Jun. 24, 2008, Numenta HTM Workshop, Jun. 23-24, 2008, SRI Campus, Menlo Park, CA, eleven pages.

Haitani, R., "Smart Video: A Disruptive Market Opportunity for HTM," Numenta HTM Workshop, 2009, twelve pages.

Han, K. et al., "Automated Robot Behavior Recognition Applied to Robotic Soccer," In Proceedings of the IJCAI-99 Workshop on Team Behaviors and Plan Recognition, 1999, six pages.

Haritaoglu, I. et al., "W4: Real-Time Surveillance of People and Their Activities," IEEE Transactions on Pattern Analysis and Machine Intelligence, Aug. 2000, pp. 809-830, vol. 22, No. 8.

Hartung, J. et al., "Presentation: Support for the Use of Hierarchical Temporal Memory Systems in Automated Design Evaluation: A First Experiment," Numenta HTM Workshop, 2009, thirty-one pages.

Hartung, J. et al., "Support for the Use of Hierarchical Temporal Memory Systems in Automated Design Evaluation: A First Experiment," Proceedings of the ASME 2009 Int'l. Design Engineering Technical Conferences & Computers and Information in Engineering Conference, Aug. 30-Sep. 2, 2009, ten pages, San Diego, CA, USA.

Hasegawa, Y. et al., "Learning Method for Hierarchical Behavior Controller," Proceedings of the 1999 IEEE International Conference on Robotics & Automation, May 1999, pp. 2799-2804.

Hawkins, J. "Hierarchical Temporal Memory: History-Progress-Today-Tomorrow," HTM Workshop, Jun. 2009, twenty-four pages.

Hawkins, J. "Prediction Toolkit Overview," Numenta HTM Workshop, 2009, four pages.

Hawkins, J. et al., "Hierarchical Temporal Memory, Concepts, Theory, and Terminology," Numenta, May 10, 2006, pp. 1-19.

Hawkins, J. et al., "Hierarchical Temporal Memory, Concepts, Theory, and Terminology," Numenta, Jan. 27, 2007, pp. 1-20.

Hawkins, J. et al., "Hierarchical Temporal Memory: Concepts, Theory and Terminology," Numenta, Inc., Mar. 27, 2007, 20 pages. [Online] [Retrieved on Sep. 22, 2011] Retrieved from the Internet<URL:http://www.numenta.com/htm-overview/education/Numenta._HTM_Concepts.pdf.>.

Hawkins, J. et al., "Hierarchical Temporal Memory: Concepts, Theory and Terminology," Numenta, May 10, 2006, [Online] [Retrieved on Oct. 7, 2008] Retrieved from the Internet<URL:http://www.numenta.com/Numenta_HTM_Concepts.pdf>.

Hawkins, J. et al., "On Intelligence," 2004, pp. 23-29, 106-174, 207-232, Times Books.

Hawkins, J. et al., "On Intelligence," Sep. 2004, Times Books, Henry Holt and Company, New York, NY 10011.

Hawkins, J. et al., "Sequence Memory for Prediction, Inference and Behaviour," Philosophical Transactions of the Royal Society B, Mar. 31, 2009, pp. 1203-1209, vol. 364. [Online] [Retrieved Sep. 22, 2011] Retrieved from the Internet <URL:http://rstb.royalsocietypublishing.org/content/364/1521/1203.full-.pdf.>.

Hawkins, J., "Why Can't a Computer Be More Like a Brain?" IEEE Spectrum, Apr. 1, 2007, pp. 21-26, vol. 44, No. 4.

Hernandez-Gardiol, N. et al., "Hierarchical Memory-Based Reinforcement Learning," Proceedings of Neural Information Processing Systems, 2001, seven pages.

Hinton, G.E. et al., "The "Wake-Sleep" Algorithm for Unsupervised Neural Networks," Science, May 26, 1995, pp. 1158-1161, vol. 268.

Hoey, "Hierarchical unsupervised learning of facial expression categories," IEEE, 2001, 0-7695-1293-3, pp. 99-106.

"HTM Algorithms," Numenta.RTM., Jun. 2008, Numenta HTM Workshop, Jun. 23-24, 2008, SRI Campus, Menlo Park, CA, 67 pages.

"HTM Optimized Drug Therapy," SDSystem24.com, Numenta HTM Workshop, Jun. 2324, 2008, SRI Campus, Menlo Park, CA 7 pages.

"HTM Workshop, Jumpstart," Numenta.RTM., Jun. 2008, Numenta HTM Workshop, Jun. 23-24, 2008, SRI Campus, Menlo Park, 86 pages.

Hyvarinen, A. et al., "Bubbles: A Unifying Framework for Low-Level Statistical Properties of Natural Image Sequences," J. Opt. Soc. Am. A., 2003, pp. 1237-1252, vol. 20, No. 7.

Isard, M. et al., "Icondensation: Unifying Low-Level and High-Level Tracking in a Stochastic Framework," Lecture Notes in Computer Science 1406, 1998, pp. 893-908, Burkhardt, H. et al., ed., Springer-Verlag, Berlin.

Kim, J. et al., "Hierarchical Distributed Genetic Algorithms: A Fuzzy Logic Controller Design Application," IEEE Expert, Jun. 1996, pp. 76-84.

Kuenzer, A. et al., "An Empirical Study of Dynamic Bayesian Networks for User Modeling," Proceedings of the UM 2001 Workshop on Machine Learning, ten pages.

Lee, T.S. et al., "Hierarchical Bayesian Inference in the Visual Cortex," J. Opt. Soc. Am. A. Opt. Image. Sci. Vis., Jul. 2003, pp. 1434-1448, vol. 20, No. 7.

Lenser, S. et al., "A Modular Hierarchical Behavior-Based Architecture," RoboCup 2001, LNAI 2377, 2002, pp. 423-428, Birk, A. et al, (eds.), Springer-Verlag, Berlin, Heidelberg.

Levinson, S. et al., "Automatic Language Acquisition for a Mobile Robot," Feb. 2005, Numenta HTM Workshop, Jun. 23-24, 2008, SRI Campus, Menlo Park, CA, twenty-seven pages.

Lewicki, M.S. et al., "Bayesian Unsupervised Learning of Higher Order Structure," Proceedings of the 1996 Conference in Advances in Neural Information Processing Systems 9, pp. 529-535.

Lim, "Estimation of Occlusion and Dense Motion Fields in a Bidirectional Bayesian Framework," IEEE Transactions on Pattern Analysis and Machine Intelligence, 2002, pp. 712-718, vol. 24, No. 5.

Lo, J. "Unsupervised Hebbian Learning by Recurrent Multilayer Neural Networks for Temporal Hierarchical Pattern Recognition," Information Sciences and Systems 44th Annual Conference on Digital Object Identifier, 2010, pp. 1-6.

Majure, L., "Unsupervised Phoneme Acquisition Using HTM," Jun. 25, 2009, eight pages.

Mannes, C., "A Neural Network Model of Spatio-Temporal Pattern Recognition, Recall and Timing," Technical Report CAS/CNS-92-013, Feb. 1992, Department of Cognitive and Neural Systems, Boston University, USA, seven pages.

Mari, J.-F. et al., "Temporal and Spatial Data Mining with Second-Order Hidden Markov Models," Soft Computing—A Fusion of Foundations, Methodologies and Applications, 2006, pp. 406-414, vol. 10, No. 5.

McDowell, C. et al., "SlugGo, a Computer Go Program," Numenta HTM Workshop, Jun. 23-24, 2008, SRI Campus, Menlo Park, CA, eighteen pages.

Miller, J. W. et al., "Biomimetic Sensory Abstraction Using Hierarchical Quilted Self-Organizing Maps," Society of Photo-Optical Instrumentation Engineers, 2006, eleven pages.

Mishkin, M. et al., "Hierarchical Organization of Cognitive Memory," Phil. Trans. R. Soc. B., 1997, pp. 1461-1467, London.

Mitrovic, A., "An Intelligent SQL Tutor on the Web," International Journal of Artificial Intelligence in Education, 2003, pp. 171-195, vol. 13.

Mohan, Accuracy and Multi-core Performance of Machine Learning Algorithms for Handwritten Character Recognition, Masters Thesis, Clemson University, Aug. 2009, pp. 1-59.

Muckli, L., "Predictive Coding in Apparent Motion," University of Glasgow, Numenta HTM Workshop, Jun. 25, 2009, twelve pages.

Murphy, K. et al., "Using the Forest to See the Trees: A Graphical Model Relating Features, Objects and Scenes," Advances in Neural Processing System, 2004, vol. 16, eight pages.

(56) References Cited

OTHER PUBLICATIONS

Murray, S.O. et al., "Shaper Perception Reduces Activity in Human Primary Visual Cortex," Proceedings of the Nat. Acad. of Sciences of the USA, Nov. 2002, pp. 15164-151169, vol. 99, No. 23.
Nair, D. et al., "Bayesian Recognition of Targets by Parts in Second Generation Forward Looking Infrared Images," Image and Vision Computing, 2000, pp. 849-864, vol. 18.
Namphol, A. et al., "Image Compression with a Hierarchical Neural Network," IEEE transactions on Aerospace and Electronic Systems, Jan. 1996, pp. 326-338, vol. 32, No. 1.
Naphade, M. et al., "Discovering Recurrent Events in Video Using Unsupervised Methods," IEEE ICIP, 2002, pp. II-13 through II-16.
Naphade, M. et al., "A Probabilistic Framework for Semantic Video Indexing, Filtering, and Retrieval," IEEE Transactions on Multimedia, Mar. 2001, pp. 141-151, vol. 3, No. 1.
Niemasik, J. "Vision Toolkit," Numenta HTM Workshop, 2009, twenty-eight pages.
Numenta, Inc., "Business Strategy," Numenta HTM Workshop, 2009, fifteen pages.
Numenta, Inc., "Hierarchical Temporal Memory including HTM Cortical Learning Algorithms, Version 0.2.1," Sep. 12, 2011, sixty-eight pages. [Online] [Retrieved Sep. 22, 2011] Retrieved from the Internet <URL:http://www.numenta.com/htm-overview/education/HTM_CorticalIL-earningAlgorithms.pdf.>.
Numenta, Inc., "Hierarchical Temporal Memory: Comparison with Existing Models, Version 1.01," Mar. 1, 2007, four pages.
Numenta, Inc., "HTM Algorithms," Jun. 2008, Numenta HTM Workshop, Jun. 23-24, 2008, SRI Campus, Menlo Park, CA, sixty-seven pages.
Numenta, Inc., "HTM Workshop, Jumpstart," Jun. 2008, Numenta HTM Workshop, Jun. 23-24, 2008, SRI Campus, Menlo Park, CA, eighty-six pages.
Numenta, Inc., "Numenta Node Algorithms Guide NuPIC 1.6," Numenta, Jul. 22, 2008, pp. 1-7.
Numenta, Inc., "Numenta Node Algorithms Guide NuPIC 1.6," Numenta, Jun. 13, 2008, pp. 1-6.
Numenta, Inc., "Numenta Platform for Intelligent Computing: Programmer's Guide Version 1.0," Mar. 2007, seventy-seven pages.
Numenta, Inc., "NuPIC Update," Numenta HTM Workshop, 2009, twenty-four pages.
Numenta, Inc., "Problem Solving with HTMs," Jun. 2008, Numenta HTM Workshop, Jun. 23-24, 2008, SRI Campus, Menlo Park, CA, twenty-three pages.
Numenta, Inc., "Prototype to Demonstrate Automated Insect Detection and Discrimination," Numenta HTM Workshop, 2009, four pages.
Numenta, Inc., "Smart Music: Combining Musical Expectations with Algorithmic Composition," Numenta HTM Workshop, 2009, seven pages.
Numenta, Inc., "Technical Keynote," Numenta HTM Workshop, 2009, seventy-two pages.
Numenta, Inc., "Temporal Model Characteristics," Numenta HTM Workshop, 2009, fourteen pages.
Numenta, Inc., "Vision Framework," Jun. 2008, Numenta HTM Workshop, Jun. 23-24, 2008, SRI Campus, Menlo Park, CA, thirty-six pages.
Numenta, Inc., "What Have We Worked on Since the 2008 Workshop? Customer Applications Presentation," Numenta HTM Workshop, 2009, thirty-five pages.
Numenta, Inc., "Zeta1 Algorithms Reference, Version 1.0," Mar. 1, 2007, thirty-seven pages.
Numenta, Inc., "Zeta1 Algorithms Reference, Version 1.2," Numenta Inc., Jun. 8, 2007, pp. 1-38.
Numenta, Inc., "Zeta1 Algorithms Reference, Version 1.3," Numenta Inc., Aug. 22, 2007, pp. 1-41.
Numenta, Inc., "Zeta1 Algorithms Reference, Version 1.5," Numenta Inc., Aug. 24, 2007, pp. 1-45.
Olshausen, B.A. et al., "A Neurobiological Model of Visual Attention and Invariant Pattern Recognition Based on Dynamic Routing Information," Journal of Neuroscience, Nov. 1993, pp. 4700-4719, vol. 13, No. 11.
Park, S. et al., "Recognition of Two-person Interactions Using a Hierarchical Bayesian Network," ACM SIGMM International Workshop on Video Surveillance (IWVS) 2003, pp. 65-76, Berkeley, USA.
PCT International Search Report and Written Opinion, PCT Application No. PCT/US2005/044729, May 14, 2007, twelve pages.
PCT International Search Report and Written Opinion, PCT Application No. PCT/US2007/003544, Jun. 16, 2008, ten pages.
PCT International Search Report and Written Opinion, PCT Application No. PCT/US07/85661, Jun. 13, 2008, six pages.
PCT International Search Report and Written Opinion, PCT Application No. PCT/US08/55389, Jul. 25, 2008, seven pages.
PCT International Search Report and Written Opinion, PCT Application No. PCT/US08/55352, Aug. 1, 2008, seven pages.
International Search Report and Written Opinion, PCT Application No. PCT/US2008/054631, Aug. 18, 2008, twelve pages.
PCT International Search Report and Written Opinion, PCT Application No. PCT/US2008/068435, Oct. 31, 2008, eleven pages.
PCT International Search Report and Written Opinion, PCT Application No. PCT/US2009/035193, Apr. 22, 2009, eleven pages.
PCT International Search Report and Written Opinion, PCT Application No. PCT/US2011/028231, May 19, 2011, nine pages.
PCT International Search Report and Written Opinion, PCT Application No. PCT/US2009/047250, Sep. 25, 2009, twelve pages.
PCT International Search Report and Written Opinion, PCT Application No. PCT/US2008/080347, Dec. 10, 2008, six pages.
Pearl, J., "Probabilistic Reasoning in Intelligent Systems: Networks of Plausible Inference," 1988, pp. 143-223, Morgan Kaufmann Publishers, Inc.
Poppel, E., "A Hierarchical Model of Temporal Perception," Trends in Cognitive Sciences, May 1997, pp. 56-61, vol. 1, No. 2.
"Problem Solving with HTMs," Numenta.RTM., Jun. 2008, Numenta HTM Workshop, Jun. 23-24, 2008, SRI Campus, Menlo Park, CA, 23 pages.
Rao, R. et al., "Predictive Coding in the Visual Cortex: A Functional Interpretation of Some Extra-classical Receptive-field Effects," Nature Neuroscience, Jan. 1999, pp. 79-87, vol. 2, No. 1.
Riesenhuber, M. et al., "Hierarchical Models of Object Recognition in Cortex," Nature Neuroscience, Nov. 1999, pp. 1019-1025, vol. 2, No. 11.
Rojas, R., "Neural Networks, A Systematic Approach," Springer-Verlag, 1996, pp. 20-21, 110-112 and 311-319.
Ross, L., "Discovering and Using Patterns in Plant Floor Data," Numenta HTM Workshop, Jun. 23-24, 2008, SRI Campus, Menlo Park, CA, twelve pages.
Saphir, B. "Numenta Web Services," Numenta HTM Workshop, 2009, twenty pages.
Saphir, B., "Power NuPIC Part II, How to Create a New Node Type," Numenta, Jun. 2008, Numenta HTM Workshop, Jun. 23-24, 2008, SRI Campus, Menlo Park, CA, thirty-two pages.
SDSYSTEM24.Com, "HTM Optimized Drug Therapy," Numenta HTM Workshop, Jun. 23-24, 2008, SRI Campus, Menlo Park, CA, seven pages.
Sinha, P. et al., "Recovering Reflectance and Illumination in a World of Painted Polyhedra," Fourth International Conference on Computer Vision, Berlin, May 11-14, 1993, pp. 156-163, IEEE Computer Society Press, Los Alamitos, CA.
Spence, C. et al., "Varying Complexity in Tree-Structured Image Distribution Models," IEEE Transactions on Image Processing, Feb. 2006, pp. 319-330, vol. 15, No. 2.
Starzyk, J.A. et al., "Spatio-Temporal Memories for Machine Learning: A Long-Term Memory Organization," IEEE Transactions on Neural Networks, May 2009, pp. 768-780, vol. 20, No. 5.
Stringer, S.M. et al., "Invariant Object Recognition in the Visual System with Novel Views of 3D Objects," Neural Computation, Nov. 2002, pp. 2585-2596, vol. 14, No. 11.
Sudderth, E.B. et al., "Nonparametric Belief Propagation and Facial Appearance Estimation," AI Memo 2002-020, Dec. 2002, Artificial

(56) References Cited

OTHER PUBLICATIONS

Intelligence Laboratory, Massachusetts Institute of Technology, Cambridge, MA, USA, eleven pages.
Thomson, A.M. et al., "Interlaminar Connections in the Neocortex," Cerebral Cortex, 2003, pp. 5-14, vol. 13, No. 1.
Thornton, J. et al., "Robust Character Recognition Using a Hierarchical Bayesian Network," Proceedings of the 19.sup.thm Australian Joint Conference on Artifical Intelligence, 2006, pp. 1259-1264.
Tsinarakis, G.J. et al. "Modular Petri Net Based Modeling, Analysis and Synthesis of Dedicated Production Systems," Proceedings of the 2003 IEEE International Conference on Robotics and Automation, Sep. 14-19, 2003, pp. 3559-3564, Taipei, Taiwan.
Tsinarakis, G.J. et al. "Modular Petri Net Based Modeling, Analysis and Synthesis and Performance Evaluation of Random Topology Dedicated Production Systems," Journal of Intelligent Manufacturing, 2005, pp. 67-92, vol. 16.
Tsukada, M, "A Theoretical Model of the Hippocampal-Cortical Memory System Motivated by Physiological Functions in the Hippocampus", Proceedings of the 1993 International Joint Conference on Neural Networks, Oct. 25, 1993, pp. 1120-1123, vol. 2.
U.S. Office Action, U.S. Appl. No. 11/010,243, Jul. 12, 2007, twelve pages.
U.S. Office Action, U.S. Appl. No. 11/147,069, Jan. 9, 2007, twenty-seven pages.
U.S. Office Action, U.S. Appl. No. 11/147,069, Jul. 29, 2009, forty-three pages.
U.S. Office Action, U.S. Appl. No. 11/147,069, Jan. 9, 2009, thirty-eight pages.
U.S. Office Action, U.S. Appl. No. 11/147,069, May 15, 2008, thirty-seven pages.
U.S. Office Action, U.S. Appl. No. 11/147,069, May 29, 2007, thirty-six pages.
U.S. Office Action, U.S. Appl. No. 11/147,069, Oct. 30, 2007, thirty-four pages.
U.S. Office Action, U.S. Appl. No. 11/351,437, Aug. 23, 2007, sixteen pages.
U.S. Office Action, U.S. Appl. No. 11/351,437, Feb. 20, 2008, six pages.
U.S. Office Action, U.S. Appl. No. 11/622,447, May 28, 2008, eighteen pages.
U.S. Office Action, U.S. Appl. No. 11/622,448, Apr. 30, 2008, seventeen pages.
U.S. Office Action, U.S. Appl. No. 11/622,448, Aug. 24, 2007, nineteen pages.
U.S. Office Action, U.S. Appl. No. 11/622,454, Jun. 3, 2008, thirteen pages.
U.S. Office Action, U.S. Appl. No. 11/622,454, Mar. 30, 2009, eleven pages.
U.S. Office Action, U.S. Appl. No. 11/622,455, Apr. 21, 2010, twelve pages.
U.S. Office Action, U.S. Appl. No. 11/622,456, Mar. 20, 2009, nine pages.
U.S. Office Action, U.S. Appl. No. 11/622,456, May 7, 2008, fourteen pages.
U.S. Office Action, U.S. Appl. No. 11/622,456, Nov. 6, 2008, seven pages.
U.S. Office Action, U.S. Appl. No. 11/622,457, Apr. 21, 2009, six pages.
U.S. Office Action, U.S. Appl. No. 11/622,457, Aug. 24, 2007, ten pages.
U.S. Office Action, U.S. Appl. No. 11/622,457, May 6, 2008, fourteen pages.
U.S. Office Action, U.S. Appl. No. 11/622,457, Nov. 20, 2008, eight pages.
U.S. Office Action, U.S. Appl. No. 11/622,458, Apr. 1, 2010, sixteen pages.
U.S. Office Action, U.S. Appl. No. 11/680,197, Mar. 23, 2010, twelve pages.
U.S. Office Action, U.S. Appl. No. 11/680,197, Sep. 14, 2010, seventeen pages.
U.S. Office Action, U.S. Appl. No. 11/713,157, Mar. 31, 2010, fourteen pages.
U.S. Office Action, U.S. Appl. No. 11/945,919, Sep. 7, 2010, nineteen pages.
U.S. Office Action, U.S. Appl. No. 12/029,434, Mar. 28, 2011, twenty-four pages.
U.S. Office Action, U.S. Appl. No. 12/029,434, Nov. 8, 2011, thirty-six pages.
U.S. Office Action, U.S. Appl. No. 12/039,630, Nov. 24, 2010, ten pages.
U.S. Office Action, U.S. Appl. No. 12/039,652, Mar. 29, 2011, fifteen pages.
U.S. Office Action, U.S. Appl. No. 12/040,849, Feb. 3, 2011, thirteen pages.
U.S. Office Action, U.S. Appl. No. 12/040,849, Jul. 1, 2011, eighteen pages.
U.S. Office Action, U.S. Appl. No. 12/147,348, Oct. 11, 2011, forty-three pages.
U.S. Office Action, U.S. Appl. No. 12/288,185, Sep. 15, 2010, eleven pages.
U.S. Office Action, U.S. Appl. No. 12/751,808, Oct. 28, 2010, thirteen pages.
U.S. Office Action, U.S. Appl. No. 13/151,928, Aug. 2, 2011, eight pages.
U.S. Office Action, U.S. Appl. No. 13/218,194, Oct. 5, 2012, fourteen pages.
U.S. Office Action, U.S. Appl. No. 13/227,355, May 25, 2012, twenty-four pages.
U.S. Office Action, U.S. Appl. No. 13/333,865, May 16, 2012, twenty-four pages.
U.S. Office Action, U.S. Appl. No. 12/483,642, Aug. 10, 2012, seven pages.
U.S. Office Action, U.S. Appl. No. 12/483,642, Apr. 26, 2012, twelve pages.
U.S. Patent Office, Final Office Action, U.S. Appl. No. 13/227,355, Dec. 19, 2012, twenty-five pages.
U.S. Patent Office, Non-final Office Action, U.S. Appl. No. 12/052,580, Dec. 21, 2012, twenty-three pages.
United States Patent Office, Office Action, U.S. Appl. No. 13/604,543, Jul. 10, 2013, thirteen pages.
U.S. Appl. No. 13/218,170, filed Aug. 25, 2011.
U.S. Appl. No. 13/218,194, filed Aug. 25, 2011.
U.S. Appl. No. 13/218,202, filed Aug. 25, 2011.
U.S. Appl. No. 13/227,355, filed Sep. 7, 2011.
U.S. Appl. No. 13/333,865, filed Dec. 21, 2011.
U.S. Appl. No. 13/604,543, Sep. 5, 2012.
U.S. Appl. No. 12/029,434, filed Feb. 11, 2008.
Van Essen, D.C. et al., "Information Processing Strategies and Pathways in the Primate Visual System," An Introduction to Neural and Electronic Networks, 1995, pp. 45-76.
Vaught, T.N., "Software Design in Scientific Computing," Jun. 23, 2008, Numenta HTM Workshop, Jun. 23-24, 2008, SRI Campus, Menlo Park, CA, thirty-two pages.
"Vision Framework," Numenta.RTM., Jun. 2008, Numenta HTM Workshop, Jun. 23-24, 2008, SRI Campus, Menlo Park, CA 36 pages.
Vlajic, "Vector Quantization of Images Using Modified Adaptive Resonance Algorithm for Hierarchical Clustering," IEEE Transactions on Neural Networks, 2001, pp. 1147-1162, vol. 12, No. 5.
Weiss, R. et al., "HyPursuit: A Hierarchical Network Search Engine that Exploits Content-Link Hypertext Clustering," Proceedings of the Seventh Annual ACM Conference on Hypertext, Mar. 16-20, 1996, pp. 180-193, Washington, D.C., USA.
Wiskott, L. et al., "Slow Feature Analysis: Unsupervised Learning of Invariances," Neural Computation, 2002, pp. 715-770, vol. 14, No. 4.
Wu, G. et al., "Multi-camera Spatio-temporal Fusion and Biased Sequence-data Learning for Security Surveillance," Association for Computing Machinery, 2003, pp. 528-538.
Yalamanchili, Hierarchical Bayesian Cortical Models: Analysis and Acceleration on Multicore Architectures, Masters Thesis, Clemson University, Aug. 2009, pp. 1-66.

(56) References Cited

OTHER PUBLICATIONS

Yedidia, J.S. et al., "Understanding Belief Propagation and its Generalizations," Joint Conference on Artificial Intelligence (IJCAI 2001), Aug. 4-10, 2001, Seattle, WA, USA, thirty-five pages.
Zemel, R.S., "Cortical Belief Networks," Computational Models for Neuroscience, 2003, pp. 267-287, Hecht-Nielsen, R. et al., eds., Springer-Verlag, New York.
United States Office Action, U.S. Appl. No. 14/149,607, Aug. 15, 2014, 4 pages.
Indian Office Action, Indian Application No. 3585/KOLN/2008, Feb. 6, 2015, 2 pages.
United States Office Action, U.S. Appl. No. 12/576,966, Mar. 15, 2012, 8 pages.
United States Office Action, U.S. Appl. No. 12/029,434, Nov. 8, 2011, 36 pages.
United States Office Action, U.S. Appl. No. 12/029,434, Mar. 28, 2011, 24 pages.
United States Office Action, U.S. Appl. No. 11/622,454, Mar. 30, 2009, 11 pages.
United States Office Action, U.S. Appl. No. 11/622,454, Jun. 3, 2008, 13 pages.
United States Office Action, U.S. Appl. No. 14/591,821, Jan. 22, 2016, 7 pages.

\* cited by examiner

HIERARCHICAL TEMPORAL MEMORY (HTM) SYSTEM DEPLOYED AS WEB SERVICE

RELATED APPLICATIONS

This application is a continuation of co-pending U.S. patent application Ser. No. 13/415,713 entitled "Hierarchical Temporal Memory (HTM) System Deployed as Web Service," filed on Mar. 8, 2012, which is a continuation-in-part of U.S. patent application Ser. No. 12/029,434 entitled "Hierarchical Temporal Memory (HTM) System Deployed as Web Service," filed on Feb. 11, 2008, which claims priority under 35 U.S.C. §119(e) to U.S. Provisional Patent Application No. 60/904,761 entitled "Hierarchical Temporal Memory (HTM) System Deployed as Web Service," filed on Feb. 28, 2007; and is also a continuation-in-part of U.S. patent application Ser. No. 12/576,966 (issued as U.S. Pat. No. 8,285,667 on Oct. 9, 2012) entitled "Sequence Learning in a Hierarchical Temporal Memory Based System," filed on Oct. 9, 2009, which is a continuation under 35 U.S.C. §120 of co-pending U.S. patent application Ser. No. 11/622,454 (issued as U.S. Pat. No. 7,620,608 on Nov. 17, 2009), entitled "Sequence Learning in a Hierarchical Temporal Memory Based System," filed on Jan. 11, 2007, which is a continuation of U.S. patent application Ser. No. 11/351,437 (now abandoned), entitled "Architecture of a Hierarchical Temporal Memory Based System," filed on Feb. 10, 2006 and claims priority under 35 U.S.C. §119(e) to U.S. Provisional Patent Application No. 60/771,990, entitled "Hierarchical Temporal Memory," filed on Feb. 10, 2006, which are incorporated by reference herein in their entirety.

This application is also related to U.S. patent application Ser. No. 11/351,437 entitled "Architecture of a Hierarchical Temporal Memory Based System," filed on Feb. 10, 2006; U.S. patent application Ser. No. 11/622,458 entitled "Belief Propagation in a Hierarchical Temporal Memory Based System," filed on Jan. 11, 2007; U.S. patent application Ser. No. 11/622,447 entitled "Extensible Hierarchical Temporal Memory Based System," filed on Jan. 11, 2007; U.S. patent application Ser. No. 11/622,448 entitled "Directed Behavior Using a Hierarchical Temporal Memory Based System," filed on Jan. 11, 2007; U.S. patent application Ser. No. 11/622,457 entitled "Pooling in a Hierarchical Temporal Memory Based System" filed on Jan. 11, 2007; U.S. patent application Ser. No. 11/622,454 entitled "Sequence Learning in a Hierarchical Temporal Memory Based System," filed on Jan. 11, 2007; U.S. patent application Ser. No. 11/622,456 filed on Jan. 11, 2007; U.S. patent application Ser. No. 11/622,455 entitled "Message Passing in a Hierarchical Temporal Memory Based System," filed on Jan. 11, 2007; and U.S. patent application Ser. No. 11/945,911 entitled "Group-Based Temporal Pooling," filed on Nov. 27, 2007, which are incorporated by reference herein in their entirety.

FIELD OF INVENTION

The present invention relates to a Hierarchical Temporal Memory (HTM) system deployed to provide a web service, more particularly to an HTM system servicing multiple client devices using the HTM system.

BACKGROUND OF THE INVENTION

Generally, a "machine" is a system or device that performs or assists in the performance of at least one task. Completing a task often requires the machine to collect, process, and/or output information, possibly in the form of work. For example, a vehicle may have a machine (e.g., a computer) that is designed to continuously collect data from a particular part of the vehicle and responsively notify the driver in case of detected adverse vehicle or driving conditions. However, such a machine is not "intelligent" in that it is designed to operate according to a strict set of rules and instructions predefined in the machine. In other words, a non-intelligent machine is designed to operate deterministically; should, for example, the machine receive an input that is outside the set of inputs it is designed to recognize, the machine is likely to, if at all, generate an output or perform work in a manner that is not helpfully responsive to the novel input.

In an attempt to greatly expand the range of tasks performable by machines, designers have endeavored to build machines that are "intelligent," i.e., more human- or brain-like in the way they operate and perform tasks, regardless of whether the results of the tasks are tangible. This objective of designing and building intelligent machines necessarily requires that such machines be able to "learn" and, in some cases, is predicated on a believed structure and operation of the human brain. "Machine learning" refers to the ability of a machine to autonomously infer and continuously self-improve through experience, analytical observation, and/or other means.

Machine learning has generally been thought of and attempted to be implemented in one of two contexts: artificial intelligence and neural networks. Artificial intelligence, at least conventionally, is not concerned with the workings of the human brain and is instead dependent on algorithmic solutions (e.g., a computer program) to replicate particular human acts and/or behaviors. A machine designed according to conventional artificial intelligence principles may be, for example, one that through programming is able to consider all possible moves and effects thereof in a game of chess between itself and a human.

Neural networks attempt to mimic certain human brain behavior by using individual processing elements that are interconnected by adjustable connections. The individual processing elements in a neural network are intended to represent neurons in the human brain, and the connections in the neural network are intended to represent synapses between the neurons. Each individual processing element has a transfer function, typically non-linear, that generates an output value based on the input values applied to the individual processing element. Initially, a neural network is "trained" with a known set of inputs and associated outputs. Such training builds and associates strengths with connections between the individual processing elements of the neural network. Once trained, a neural network presented with a novel input set may generate an appropriate output based on the connection characteristics of the neural network.

SUMMARY OF THE INVENTION

Embodiments of the present invention provide a web-based hierarchical temporal memory (HTM) system in which one or more client devices communicate with a remote server via a communication network to submit input data for inference. The remote server includes at least a HTM server for implementing a hierarchical temporal memory (HTM). The client devices generate input data including patterns and sequences, and send the input data to the remote server for processing. The remote server (specifically, the HTM server) performs HTM-based processing for determining the causes of the input data, and sends the result of the processing to the client devices.

In one or more embodiments, the HTM updates its learning based on sample input data and supervisory signals received from the client devices. The supervisory signals indicate the correct classification of the input data. The HTM can accumulate an extensive amount of sample input data from multiple client devices, and can make more accurate inference for subsequent inference requests from the client devices.

In one or more embodiments, the input data is transmitted from the client device to the remote server via TCP/IP (Transmission Control Protocol/Internet Protocol) and HTTP (Hypertext Transfer Protocol). These protocols are widely used and compatible across multiple platforms. By using TCP/IP and HTTP protocols, diverse types of client devices may be served by the remote server.

Embodiments of the present invention also provide a client device for submitting input data to a web-based HTM network via a communication network. The client device collects information or data and generates the input data for processing by the HTM network. The process manager of the client device manages the process associated with the submission of the input data and receiving of the process output from the HTM network.

Embodiments of the present invention also provide a server for receiving the input data from the client devices and for performing inference on the input data to generate an output. The output may be a belief vector representing the belief or likelihood that the patterns and sequences in the input data correspond to the categories learned by the HTM network. The server may also include a gateway server for communicating with the client devices over the communication network.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE FIGURES

The teachings of the present invention can be readily understood by considering the following detailed description in conjunction with the accompanying drawings.

DETAILED DESCRIPTION OF THE INVENTION

Figure 1:
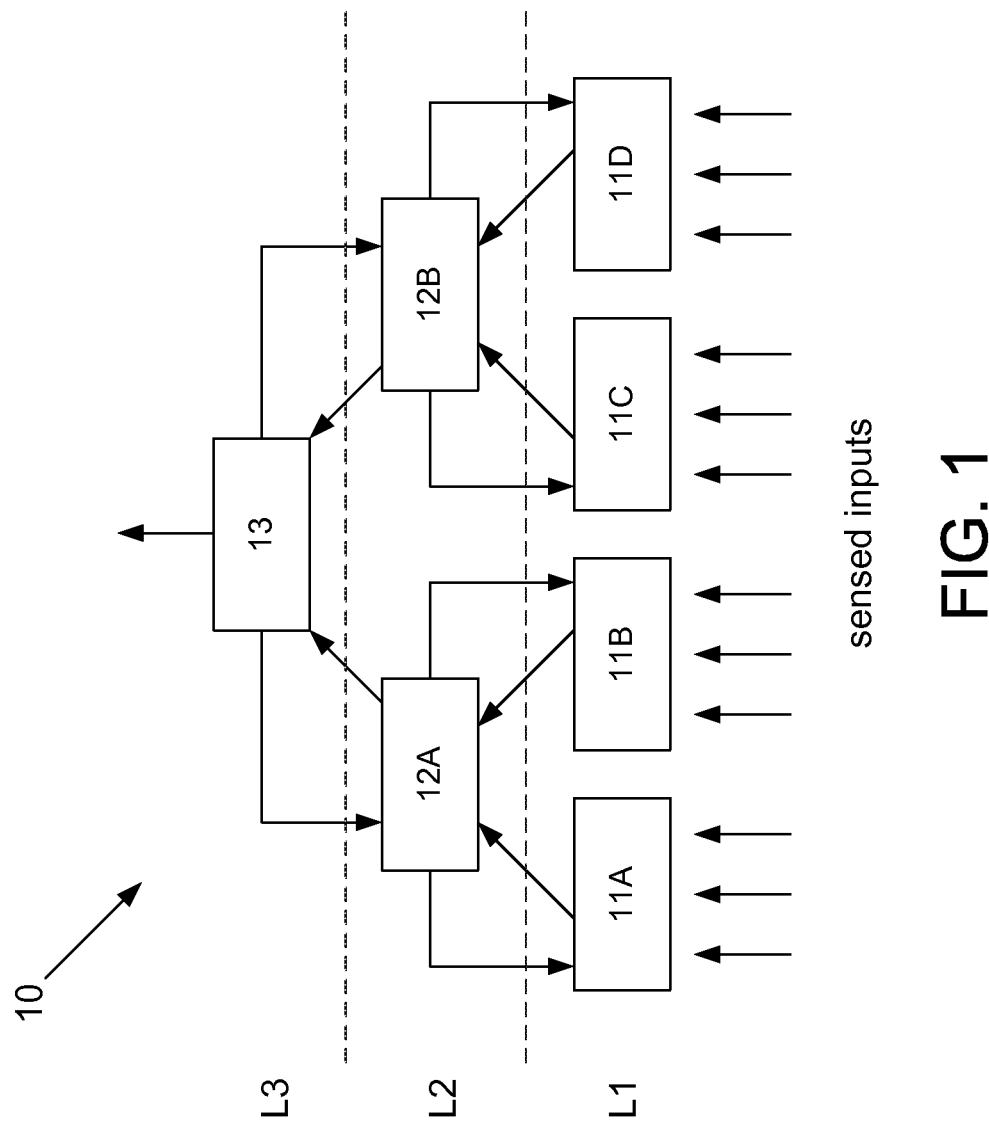
FIG. 1 is a schematic diagram illustrating a hierarchical temporal memory (HTM) system, according to one embodiment.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD- ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Architecture of the System

Hierarchical Temporal Memory (HTM) Systems represent a new approach to machine intelligence. In HTM systems, training data comprising temporal sequences of patterns are presented to a network of nodes. The HTM systems then build a model of the statistical structure inherent to the patterns and sequences in the training data, and thereby learns the underlying 'causes' of the temporal sequences of patterns and sequences in the training data. The hierarchical structure of the HTM systems allow them to build models of very high dimensional input spaces using reasonable amounts of memory and processing capacity.

FIG. 1 is a diagram illustrating a hierarchical nature of the HTM network 10 has three levels L1, L2, L3, with level L1 being the lowest level, level L3 being the highest level, and level L2 being between levels L1 and L3. Level L1 has nodes 11A, 11B, 11C and 11D; level L2 has nodes 12A and 12B; and level L3 has node 13. In the example of FIG. 1, the nodes 11A, 11B, 11C, 11D, 12A, 12B, and 13 are hierarchically connected in a tree-like structure such that each node has several children nodes (i.e., nodes connected at a lower level) and one parent node (i.e., node connected at a higher level). Each node 11A, 11B, 11C, 11D, 12A, 12B, and 13 may have or be associated with a capacity to store and process information. For example, each node 11A, 11B, 11C, 11D, 12A, 12B, and 13 may store sensed input data (e.g., sequences of patterns) associated with particular causes. Further, each node 11A, 11B, 11C, 11D, 12A, 12B, and 13 may be arranged to (i) propagate information "forward" (i.e., "up" an HTM hierarchy) to any connected parent node and/or (ii) propagate information "back" (i.e., "down an HTM hierarchy) to any connected children nodes.

The nodes are associated or coupled to each other by links implemented as hardware or software. A link represents a logical or physical relationship between an output of a node and an input of another node. Outputs from a node in the form of variables are communicated between the nodes via the links. Inputs to the HTM 10 from, for example, a sensory system, are supplied to the level L1 nodes 11A-D. A sensory system through which sensed input data is supplied to level L1 nodes 11A-D may relate to various senses (e.g., touch, sight, sound).

The HTM training process is a form of unsupervised machine learning. However, during the training process, labels attached to the input patterns may be presented to the HTM as well. These labels allow the HTM to associate particular categories with the underlying generative causes that are learned. Once an HTM network has built a model of a particular input space, it can be switched into 'inference' mode. In this mode, novel input patterns are presented to the HTM, and the HTM will generate a 'belief vector' that provides a quantitative measure of the degree of belief or likelihood that the input pattern was generated by the underlying cause associated with each of the labeled categories to which the HTM was exposed during the training stage.

For example, an HTM might have been exposed to images of different animals, and simultaneously provided with category labels such as 'dog', 'cat', and 'bird' that identifies objects in the images during this training stage. In the inference stage, the network may be presented with a novel image of an animal, and the HTM may generate a vector of belief values. Each element in this vector represents the relative belief or likelihood that the novel input pattern is an image of a 'dog', 'cat', 'bird', etc.

The range of pattern recognition applications for which an HTM could be used is very wide. Example applications could include the categorization of email messages as unsolicited bulk email (i.e., 'spam') or legitimate email (non-spam), digital pictures as pornographic or non-pornographic, loan applicants as good or bad credit risks, network traffic as malicious or benign, etc.

One problem is that in many of these potential applications, it is impractical to deploy a large memory and computation intensive fully trained HTM at the location in which classification decisions need to be made. For example, an HTM that was trained on millions of examples of spam and non-spam email messages could become very effective at classifying new email messages as spam or non-spam. However, this HTM might also require a substantial amount of computing power and memory to perform such classifications. These memory and processing requirements might restrict the areas in which the HTM could be deployed. For example, a typical mobile phone would not be expected to contain enough processing power to run a large-scale HTM spam/no-spam classification network.

Another problem is that the software required to run the HTM network may not have been ported to all operating systems. It is impractical to have complex software code that runs on all common operating systems. For example, if the HTM software only runs on UNIX machines, then users with Windows PC's will not be able to run the network even if they have sufficient memory and processing resources.

A third problem is that the installation process may be cumbersome or impractical for some users even if they have a supported operating system with sufficient resources. For example, the user may not have administrative privileges on their computer that may be required for installation. Alternatively, the user may simply wish to run a quick demonstration of the software and are not willing to perform a complex installation process.

The HTM network may be located at a central location with ample computing resources. The classification and inference capabilities of the HTM network are made available via a communication network for one or more client devices. The client device may have limited computing and storage resources. The client device can communicate with the HTM network via the communication network to take advantage of the power of the HTM network by submitting an inference request. Communicating via the electronic communication channel with the HTM network is advantageous because any device can leverage the full power of HTM Technology as long as it has access to the a HTM network via the communication network and simple client module or software. Furthermore, the client devices with an operating system incapable of running the HTM can nevertheless take advantage of the classification and inferring capability of the HTM network via the communication network.

A web-based HTM network refers to a HTM network accessed via a communication network using various protocols including, among others, TCP/IP (Transmission Control Protocol/Internet Protocol), HTTP (Hypertext Transfer Protocol) and other networking protocols. The communication network for accessing the HTM network may include, among other networks, the Internet, a telephone network, and a cable network.

Figure 2:
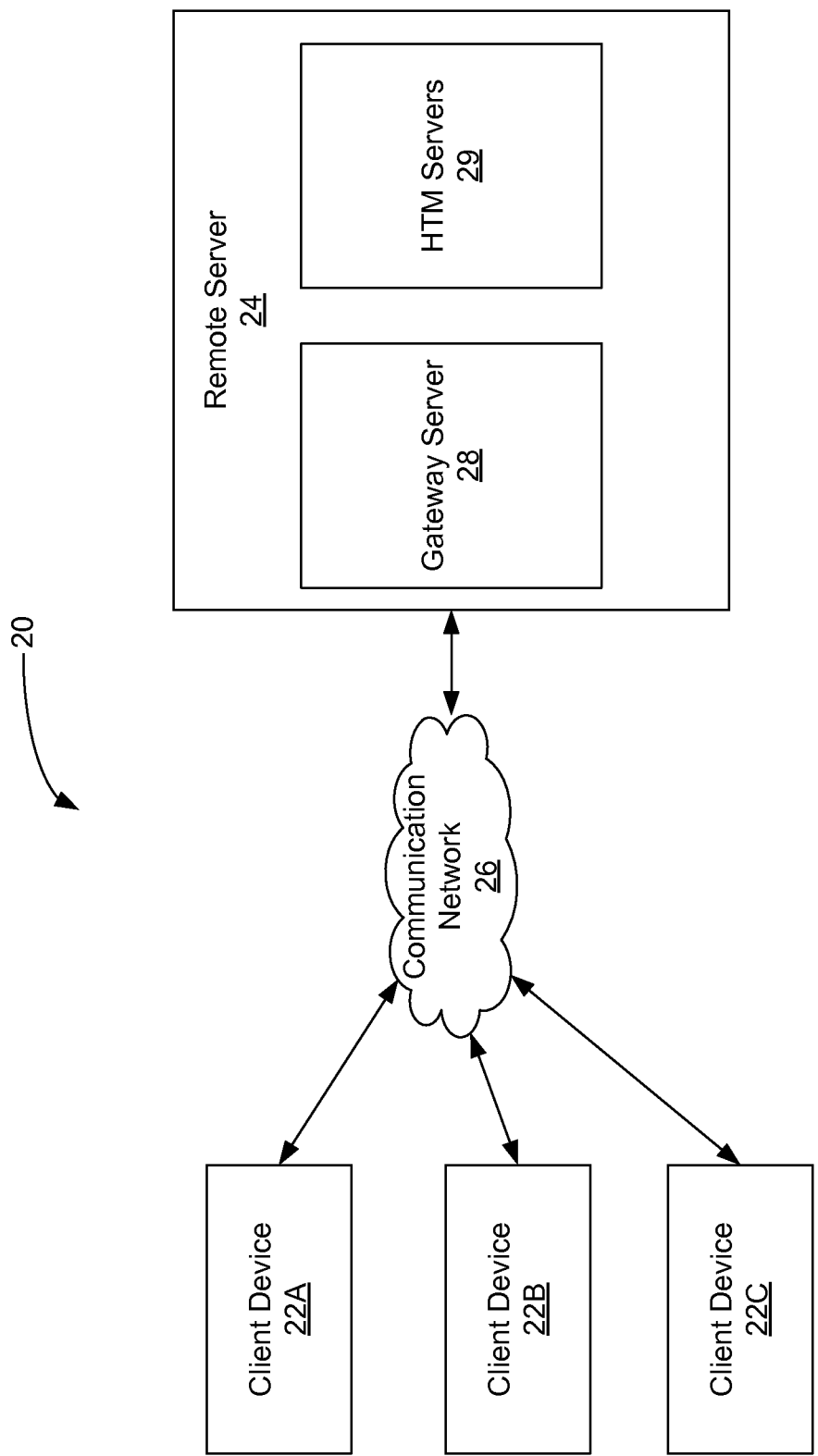
FIG. 2 is a block diagram illustrating the architecture of the HTM system implemented as a web service, according to one embodiment.

FIG. 2 is a block diagram illustrating the architecture of the HTM system 20 implemented as a web service, according to one embodiment. In the HTM system 20, one or more client devices 22A-C (hereinafter collectively referred to also as the client device(s) 22) communicate with a remote server 24 via a communication network 26. The communication network 26 may be, among other networks, the Internet or World Wide Web (WWW). The messages between the client devices 22A-C and the remote server 24 are transmitted using a set of mutually agreed upon protocols that are recognized by both client devices 22A-C and the remote server 24. In one or more embodiments, the messages adhere to the universally implemented set of TCP/IP and HTTP. In another embodiment, the HTTP protocol is replaced with an alternative protocol, such as HTTPS, or other customized proprietary protocols.

The primary function of the client devices 22A-C is to generate input data and provide the input data to the remote server 24. The client devices 22A-C may serve other functions such as cellular phone services or internet browsing. In one embodiment, the client device 22A-C is a desktop or laptop computers. In another embodiment, the client device 22A-C is a mobile phone. In this embodiment, the client device 22A-C may receive an incoming text message and determine whether or not the text message is spam before presenting the text message to the user. The client devices 22A-C may provide the incoming text messages to the HTM server 24 to determine if the patterns and sequences in the text messages indicate one of two categories, spam or non-spam. In still another embodiment, the client devices 22A-C capture images of objects, and provide the images to the HTM server 24 to identify or infer the objects in the images.

The primary function of the remote server 24 is to perform classification or inference on the input data received from the client devices 22A-C. The remote server 24 includes, among other components, a gateway server 28 and one or more HTM servers 29. The gateway server 28 receives inference requests from the client devices and extracts the input data from the inference requests, as described below in detail with reference to FIG. 4. The HTM network implemented on the HTM servers 29 learns the patterns and sequences in the input data in a training mode, and then infers causes of the input data as described, for example, in U.S. patent application Ser. No. 11/351,437 entitled "Architecture of a Hierarchical Temporal Memory Based System," filed on Feb. 10, 2006, which is incorporated by reference herein in its entirety. Additional components of the HTM servers 29 are described below in detail with reference to FIG. 6. The HTM servers 29 then return results indicating the causes (or likely causes) of the input data to the client devices 22A-C via the communication network 26. The client devices 22A-C then performs some useful actions based on the result received from the HTM servers 29.

Figure 3:
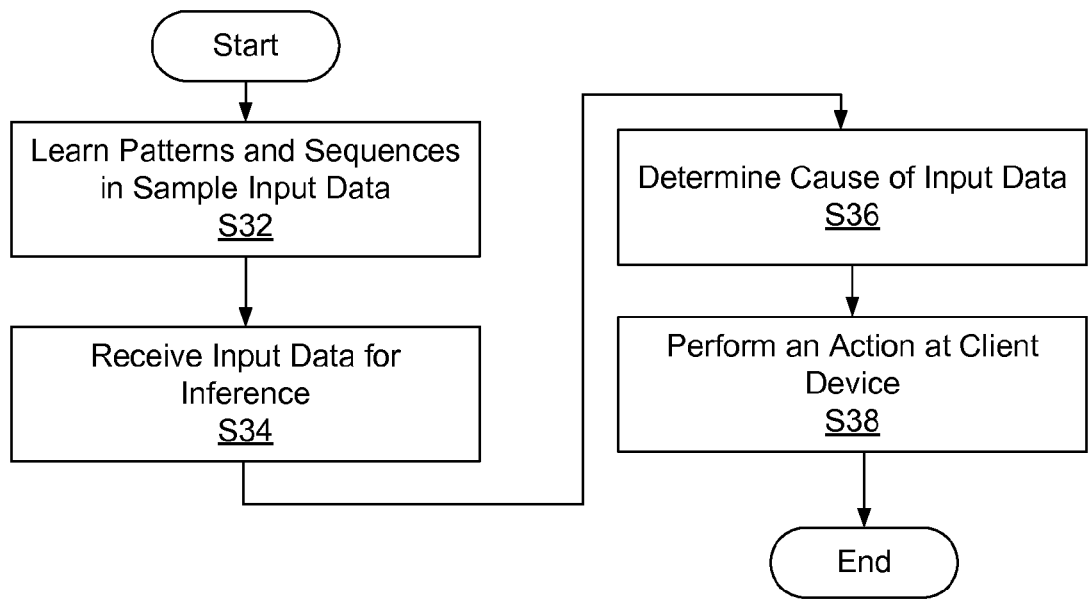
FIG. 3 is a flowchart illustrating a method of learning and then inferring causes of input data using the HTM system, according to one embodiment

FIG. 3 is a flowchart illustrating a method of learning and then inferring the causes of the input data using a HTM network, according to one embodiment. First, the HTM network as implemented on the HTM servers 29 learns S32 patterns and sequences in sample input data provided to the HTM networks. In one embodiment, the sample input data is provided in a separate routine that does not involve the client devices 22A-C (e.g., pre-stored sets of sample input data and correct categories). In another embodiment, the sample input data is provided to the remote server 24 via the client devices 22A-C. It is often impractical to get a comprehensive training set from a single user or client device 22A-C. Therefore, multiple client devices 22A-C collectively submit training sample data to the remote server 24, which then learns to form a statistical model of this particular input space.

The client devices 22A-C send the input data to the remote server 24. The remote server 24 then receives S34 the input data for inference. The HTM network running on the HTM servers 29 determines S36 the causes of the input data and generates a belief vector representing the belief or likelihood that the input data represent certain categories learned by the HTM network. The remote server 24 then sends the belief vector to the client devices 22A-C based upon which the client devices 22A-C may perform S38 certain useful actions (e.g., block spam emails, identify the object in the image).

Gateway Server

The gateway server 28 of the remote server 24 receives HTM requests from the client devices 22A-C, extracts the input data from the requests, and then relays the input data and auxiliary data to an appropriate HTM Server 29 for processing. In one example, the HTM request consists of input data upon which inference is to be performed by the HTM servers 29. In another example, the HTM request is an input pattern associated with a known category that is to be submitted to an HTM network 29 as a training sample.

Figure 4:
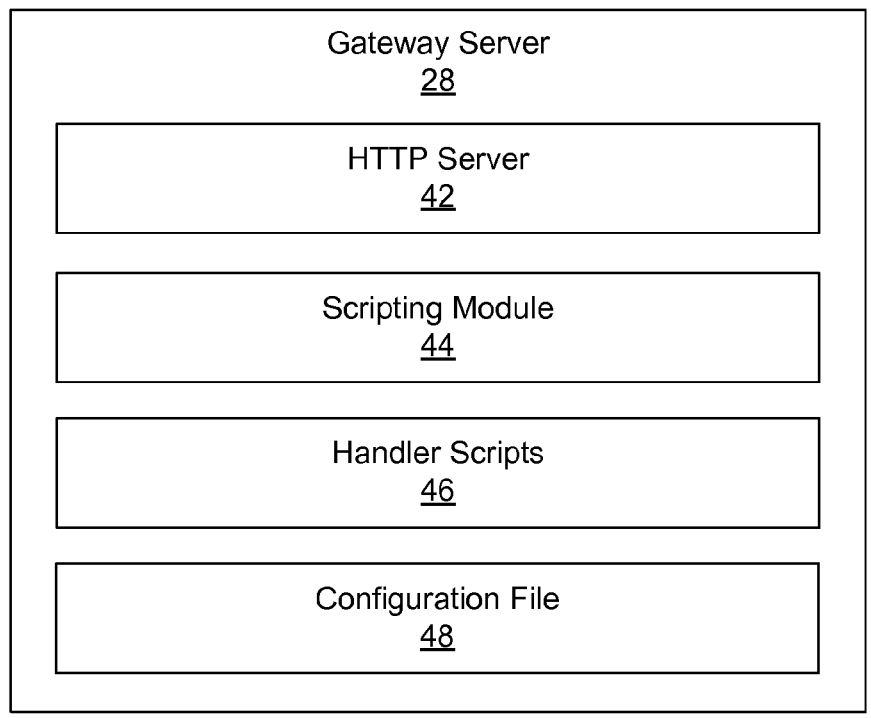
FIG. 4 is a block diagram illustrating the gateway server of a remote server, according to one embodiment.

FIG. 4 is a block diagram illustrating the gateway server 24, according to one embodiment. The gateway server 24 includes, among other components, an HTTP server 42, a scripting module 44, handler scripts 46 and a configuration file 48. The HTTP server 42 supports general purpose processing of connection requests conforming to the HTTP standard. The scripting module provides the infrastructure needed to dynamically process requests from the client devices 22A-C. One or more handler scripts 46 process the incoming requests from the client devices 22A-C, and relay them to the HTM servers 29.

In one embodiment, the HTTP server 42 and the scripting module 44 consist of the Apache web server configured with the mod_python scripting module (as described at www.apache.org). The handler scripts 46 are programs written in Python scripting language that reside on the physical server (s) hosting the gateway server 24. Alternatively, any programming language may be used in the scripting module 44 to process the requests from the client devices 22A-C.

In one embodiment, the HTTP server 42 is launched and binds to TCP port 80 on a physical computer server that has been configured with a public IP address. The HTTP server 42 also initializes the scripting module 44. When the client device 22A-C submits a request, the HTTP server 42 will invoke the scripting module 44. The scripting module 44 then invokes the handler scripts 46 to process that request. The HTTP server 42 and the scripting module 44 parse the request from the client devices 22A-C (in raw HTTP format) and extract any data from the POST field. This POSTed data will be provided as an argument to the handler scripts 46.

The handler scripts 46 then consult the configuration file 48 that stores a list of hostnames or IP addresses and port numbers for one or more HTM servers 29. In one embodiment, the handler scripts 46 randomly select an HTM server 29 from this list of HTM servers. The handler script 46 then attempts to establish an RHTMP (Remote Hierarchical Temporal Memory Protocol) connection to the selected HTM server, as described below in detail with reference to FIG. 7. If the selected HTM server is idle, it will accept the connection and process the request.

On the other hand, if the selected HTM server is busy processing a previously submitted request or is unavailable for some other reason, then the selected HTM server refuses the connection from the handler script 46. In this case, the handler script 46 selects the next HTM server in the configuration file 48 and again attempt to establish an RHTMP connection. The handler scripts 46 continue sequentially through the list of HTM servers until it is able to successfully establish an RHTMP connection.

The configuration file 48 also contains instructions to the handler script 46 that specify at what point the handler script 46 is to abandon any further attempts at processing the RHTMP request. In one embodiment, the handler scripts 46 attempt two full passes through the list of HTM servers and then abandon any further attempts if no HTM server 29 is available during these two passes. If the handler scripts 46 fail to establish a connection to an HTM server, the handler scripts 46 formulate an RHTMP response to the client devices 22A-C that indicates that all HTM servers 29 are currently busy and that the HTM request could not be processed. The client device 22A-C then takes appropriate action (e.g., alert to the user that the HTM server is not available).

If an HTM server is idle and accepts the RHTMP connection from the handler scripts 46, the handler scripts 46 wait for the HTM server 29 to complete the processing of the HTM request. After the HTM server 29 completes the processing, the HTM server 29 responds to the handler scripts 46 with the results. The handler script 46 then formulates a valid HTTP response by embedding the raw RHTMP response data from the HTM server 29. This HTTP response will be transmitted to the client devices 22A-C.

In one embodiment, the handler scripts 46 can process multiple simultaneous requests because the underlying HTTP server 42 is a multi-threaded application that can spawn parallel processes. Each of these processes runs a separate instance of the handler script 46 to service a particular client device.

In one embodiment, multiple gateway servers are deployed behind a load-balancing device. In such an embodiment, each gateway server would reside on a separate physical computer server; the load-balancing device would be responsible for dividing incoming requests from the client devices 22A-C to the various gateway servers in a "round robin" manner.

In one embodiment, the client device 22 transmits its unique ID number identifying the type of the client device to the gateway server 28. The handler scripts 46 then identify the particular client device 22 sending the input data or the type of the client device 22, and select an HTM server that is configured or adapted for a particular client device or types of client devices. By specializing and managing the HTM server 29 for a particular client device or types of client devices, the HTM server 29 may perform inference or classification more efficiently and accurately because the HTM server 29 need not address idiosyncrasies (e.g., different hardware characteristics of sensors) in different client devices.

Client Device

Figure 5:
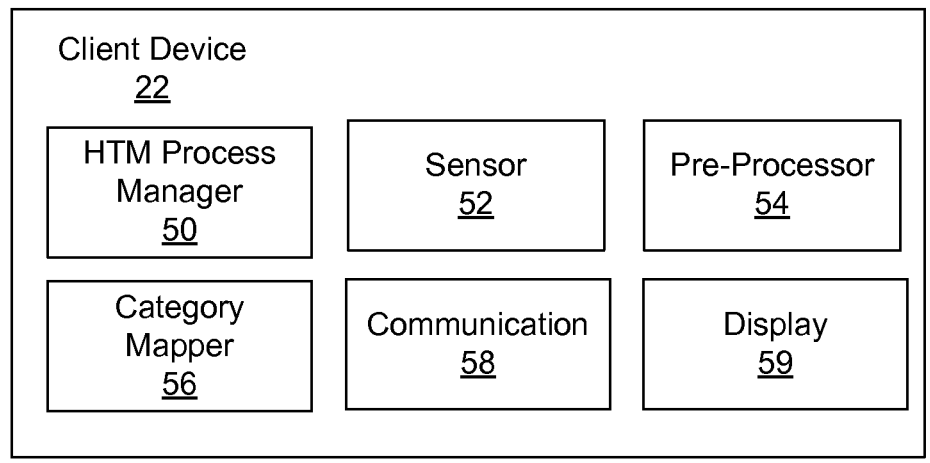
FIG. 5 is a block diagram illustrating a client device communicating with the remote server, according to one embodiment.

FIG. 5 is a block diagram illustrating a client device 22 communicating with the remote server 24, according to one embodiment. The client device 22 includes, among other components, an HTM process manager 50, a sensor 52, a pre-processor 54, a category mapper 56, a communication module 58, and a display device 59. The HTM process manager 50 is responsible for managing the overall process of providing the input data to the remote server 24, and receiving the results from the remote server 24.

The sensor 52 is any component of the client device 22 that generates input data including patterns and sequences. The sensor 52 includes traditional hardware components such as a camera, microphone, and thermometer for sensing the environment. The sensor 52 also includes software components for processing data received at the client device 22 or stored in the client device 22. For example, the sensor 52 may be a database storing financial information (e.g., stock price fluctuations) or text parser extracting text from email messages.

The pre-processor 54 is a signal processor for processing the input data so that the input data can be presented to the remote server 24 in an efficient and uniform manner. For example, the pre-processor 54 may process a color image captured by the sensor 56 (camera) into a grayscale image or a black and white image for a HTM network that works only with grayscale images or black and white images. Alternatively, the pre-processor 54 may convert a high resolution image into a low resolution image for a HTM network that is adapted for low resolution images. The pre-processed input signal may be provided to the HTM process manager 50 which packages each input data into an HTM request message. The HTM processor manager 50 then submits the HTM request to the remote server 24.

In one embodiment, the HTM process manager 50 generates a HTM request message including the input data to be submitted to the HTM servers 29 for the purpose of performing an inference or classification on the input data. The HTM process manager 50 then waits for a response from the gateway server 24. After receiving the response from the gateway server 24, the HTM process manager 50 takes actions based upon the result of the inference or classification. The category mapper 56 receives category information from the remote server 24 and maps the result of the inference or classification to the category already received from the remote server 24, as described below in detail with reference to FIG. 7. The HTM process manager 50 may also store identification that uniquely identifies the client device 22 from other client devices or identifies the type or group of devices to which the client device belongs. The identification may be sent to the gateway server 28 so that the gateway server 28 can forward the input data included in the HTM requests to an HTM server 29 configured and adapted for the particular client device 22 or the type/group of the client devices.

The communication module 58 allows the client device 22 to communicate with the remote server 24 via the communication network 26. The communication module 58 may include, for example, Ethernet components, WiFi components, and Bluetooth components for communicating over various wired or wireless channels.

The display device 59 displays various information including, for example, the result of inference or classification received from the HTM server 29, for example, as described below in detail with reference to FIG. 8. In other embodiments, different devices may be employed to perform various actions based on the output from the HTM server 29. As described above, the HTM process manager 50 may invoke actions on such components of the client device 22 or provide information upon which other components of the client device 22 may perform certain actions.

The client device 22 also includes an operating system (not shown) managing various resources available on the client device 22. The operating system provides a platform upon which other components (e.g., HTM process manager 50) of the client device 22 can operate. As described above, the operating system of the client device 22 need not be capable of running the HTM network. Also, the operating system of the client device 22 need not be compatible or identical with the operating system of the remote server 24 as long as compatible HTM requests can be generated and sent to the remote server 24 using mutually agreed upon communication protocol.

Each of these functional components of the client device 22 can be implemented separately or can be implemented together. For example, the HTM process manager 50 and the pre-processor 52 can be implemented as one module. Moreover, each component of the client device 22, whether alone or in combination with other components, can be implemented for example, in software, hardware, firmware or any other combination thereof.

HTM Server

Figure 6:
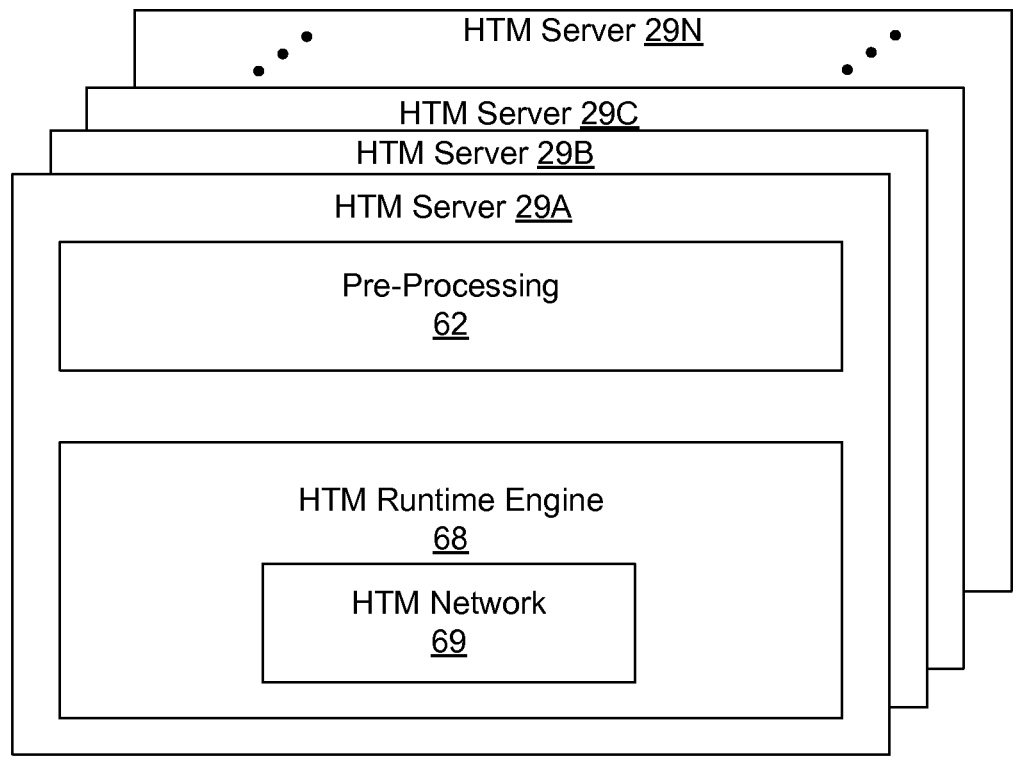
FIG. 6 is a block diagram illustrating HTM servers, according to one embodiment.

FIG. 6 is a block diagram illustrating HTM servers 29A-N, according to one embodiment. The HTM servers 29A-N are hereinafter collectively referred to as the HTM server(s) 29. The remote server 24 includes one or more HTM servers 29A-N. The remote server 24 may include multiple HTM servers to serve large amounts of HTM requests from many client devices 22. In one or more embodiments, each HTM server 29A-N may have different components and configurations to function with different types of client devices. Also, each HTM server 29A-N may be implemented on the same physical server, or on separate physical servers.

Each remote server 24 includes, among other components, a pre-processing module 62 and a HTM runtime engine 68. Each component of the HTM server 29, whether alone or in combination with other components, can be implemented for example, in software, hardware, firmware or any other combination thereof. In one or more embodiments, the multiple HTM servers 29A-N collectively form a large HTM network 69 where each HTM server 29A-N implements a portion of the HTM network.

The pre-processing module 62 is substantially the same as the pre-processor 54, as described above in detail with reference to FIG. 5. That is, the input data sent by the client device 22 in a non-compatible or unsuitable format for processing by the HTM network 69 is converted into data compatible or suitable for processing by the HTM network 69 before being submitted to the HTM network 69.

The HTM runtime engine 68 is a component of the HTM server 29 that instantiates and operates the HTM network 69. The HTM runtime engine 68 instantiates one or more HTM networks 69 that include nodes arranged in a hierarchical structure, for example, as described above with reference to FIG. 1. In one or more embodiments, a single HTM network 69 is fully pre-trained and tested, and operates in the inference mode. During the training stage, the HTM network 69 is exposed to a large amount of sample input data along with supervisory category information indicating the correct category of the sample input data, as described above with reference to FIG. 3. Based on the sample input data and the supervisory category information, the HTM network 69 formulates a model of the statistical properties and underlying causes inherent to the input data. In an inference mode, the HTM network 69 classifies any arbitrary input data into categories learning in the training mode, and generates a vector representing the possibility that the input data correspond to the learned categories.

In another embodiment, the HTM network 69 is fully trained and is deployed while it is still in the learning mode. The input data and associated known category labels submitted by the client device 22 are fed to the HTM network 69 to further train the HTM Network 69.

In another embodiment, the HTM network 69 is partially trained and can service inference requests from the client devices 22 while simultaneously refining its model by using the sample input data submitted from the client devices 22 as additional training samples.

In one embodiment, the configuration of the HTM network 69 is stored as an XML file on a networked file system that is common to multiple HTM servers 29A-N. Each HTM server 29A-N loads a copy of this HTM network file into memory upon initialization to establish an instantiation of the HTM network. In another embodiment, the HTM servers 29A-N read relevant portions of the XML file to initialize portions of the HTM networks. Storing the configuration of the HTM network 69 on a networked file system facilitates coordination and operation of a large HTM network that is distributed across multiple HTM servers 29A-N.

In one or more embodiments, multiple HTM servers 29A-N may exist and operate on a single physical computer server. On startup, an HTM Server 29 binds to a particular TCP/IP port on the physical computer server upon which it resides. Multiple HTM Servers residing on a single physical computer server will bind to different ports.

In one embodiment, two physical servers each host four HTM servers; these four HTM Server processes bind to TCP/IP ports 8300, 8301, 8302, and 8303. The HTM servers need not be hosted on physical computers configured with public IP addresses because they do not need to be directly addressable by the client devices 22 (only the gateway server 28 require public IP addresses).

Communication Protocols

In one embodiment, communication between components of the remote server 24 and the client devices 22 takes place using the following protocols: (a) TCP/IP Protocol; (b) HTTP Protocol; and (c) Remote HTM Protocol ("RHTMP"). These protocols are layered in a hierarchical manner, with the TCP/IP Protocol residing at the bottom-most layer and the RHTMP Protocol residing at the top-most layer.

The TCP/IP Protocol is used to handle the basic tasks of establishing remote connections, transmitting and receiving sequences of packets, and routing these packets through the communication network 26 from source machine to destination machine. The TCP/IP Protocol is employed to communicate between the client devices 22 and the remote server 24.

The HTTP Protocol is an open standard that operates at a higher level than TCP/IP. The HTTP Protocol is used by both the client device 22 and the gateway server 28. Specifically, the HTTP Protocol is used by the client device 22 to formulate an HTM request and to submit input data to the gateway server 28. In one or more embodiment, a POST request, as defined by the HTTP Protocol, is employed to submit the input data from the client device 22 to the remote server 24.

The RHTMP Protocol operates at a higher level than HTTP. The RHTMP Protocol is used primarily by the client devices 22 and the HTM servers 29. The gateway server 28 does not normally participate as an active endpoint party in an RHTMP session. Instead, the gateway server 28 simply relays incoming RHTMP requests to an appropriate HTM server 29. Likewise, the gateway server 28 relays the result of inference or classification from the HTM servers 29 to the client devices 22.

The RHTMP Protocol defines a specific set of HTM requests that a client device 22 can submit to the HTM server 29. In one or more embodiments, the HTM requests from the client device 22 may take the form of GetCategoryInfo or RunInference.

GetCategoryInfo is an RHTMP request from the client device 22 requesting the HTM server 29 to send a complete description of the categories previously learned by the HTM network 69. The response from the HTM server 29 typically includes the name of the category, a description of the category, one or more canonical or representative examples of the category, and a unique integer index that will serve as an identification (ID) number for the category in the subsequent responses from the HTM server 29. By transmitting the integer indices in subsequent responses, the HTM server 29 need not send duplicative information on the learned categories (e.g., name or other identification of the category) repeatedly. The amount of data included in the subsequent responses from the HTM server 29 may be reduced by sending the indices instead of the full information (e.g., the name of the category, a description of the category, one or more canonical or representative examples of the category) associated with the categories each time. In one embodiment, the client device 22 sends no other auxiliary data in a GetCategoryInfo request.

RunInference is an RHTMP request from the client device 22 requesting that the HTM server 29 perform inference or classification on input data. When the client device 22 submits a RunInference request, the client device 22 also sends the input data to the HTM server 29 as auxiliary data upon which inference is being requested. The HTM server 29 performs inference on the submitted input data and outputs a belief vector to be sent as a response to the client device 22. The belief vector is comprised of a list of floating point numbers that represent the distribution of belief (probabilities) over the set of categories previously learned by the HTM network 69. In one or more embodiments, the particular categories in the belief vector are identified by unique ID numbers as originally provided to the client device 22 by the HTM server 29 in response to a GetCategoryInfo request.

In one or more embodiments, an RHTMP SubmitTrainingSample request may be sent from the client device 22 to the HTM server 29 to submit sample input data to the HTM network 29 for training. A SubmitTrainingSample request includes sample input data and a unique ID number indicating the category of the input data as a supervisory signal. The ID number is the identification of the category as originally provided to the client device 22 by the HTM server 29 in response to a previous GetCategoryInfo request. After receiving a SubmitTrainingSample request, the HTM server 29 sends a response to the client device 22 that acknowledges receipt of the submitted input sample but which contains no additional data.

Figure 7:
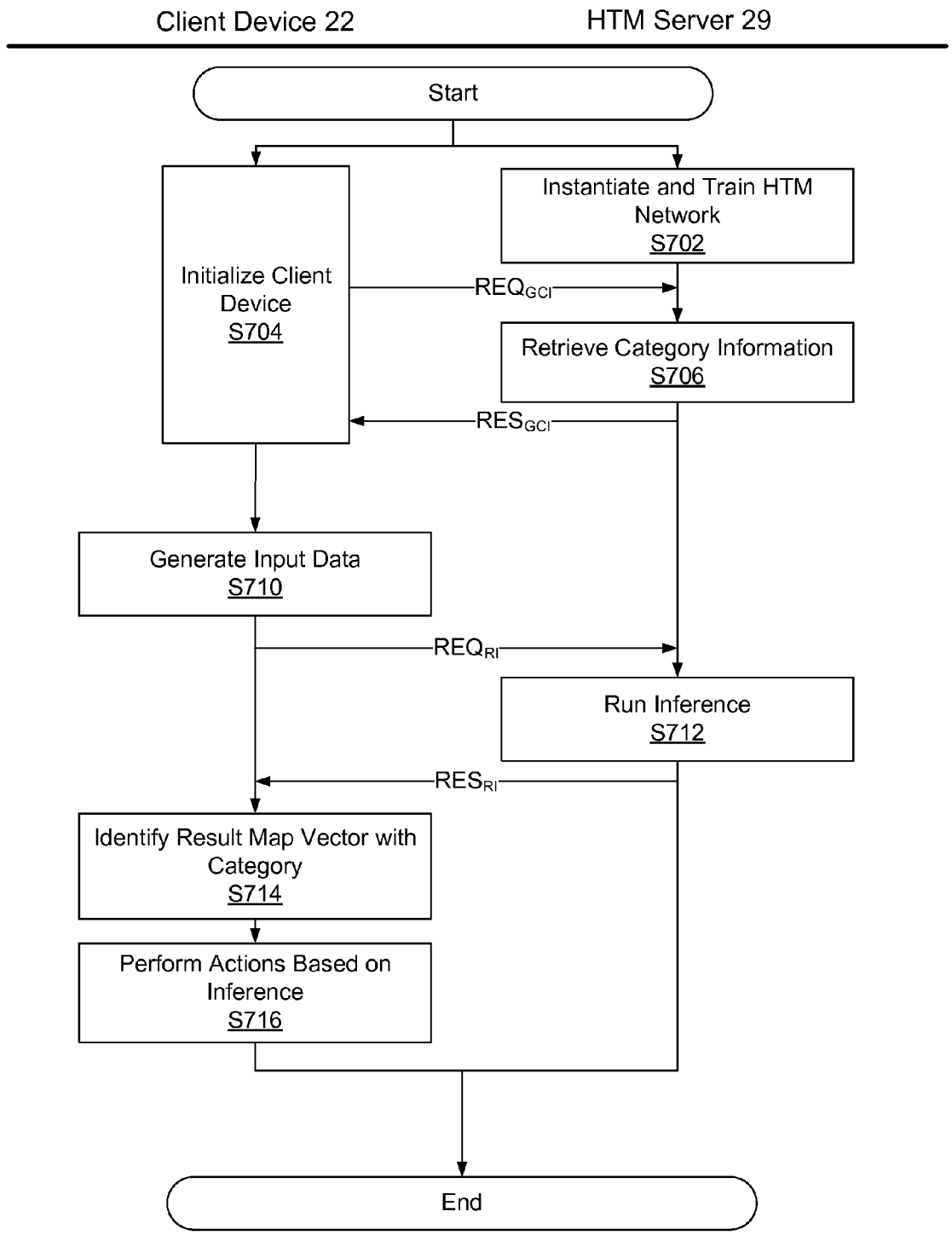
FIG. 7 is a flowchart illustrating a method of inferring causes of sensed input data received at the client device using the HTM network implemented on a HTM server, according to one embodiment.

FIG. 7 is a flowchart illustrating a sequence of operating the HTM network via the RHTMP sessions, according to one embodiment. First, the HTM network 29 is instantiated and trained S702 using sample input data and supervisory signals indicating the correct category of the sample input data. The client device 22 is also initialized S704 to participate in RHTMP sessions. As part of the initialization S704 of the client device 22, the client device 22 submits a GetCategoryInfo request ($REQ_{GCI}$) to the HTM server 29. The client device 22 typically submits only a single GetCategoryInfo request ($REQ_{GCI}$), which takes place during initialization.

In response, the HTM server 29 retrieves S706 the category information from its HTM runtime engine 68, and sends a response $RES_{GCI}$ including, among other information, the integer indices that serve as ID numbers for the categories previously learned by the HTM network 69. This category information may also include the name of the category, a description of the category, and one or more canonical or representative examples of the category. The client device 22 then maps the ID numbers to the category learned by the HTM network 69 and stores the mapping in the category mapper 56 for later retrieval.

After initializing S704 the client device 22, the client device 22 generates input data using its sensor(s) 52. After processing the sensed input data by the pre-processor 54, the client device 22 submits a RunInference request ($REQ_{RI}$) to the HTM server 29. The input data upon which inference is to be performed is included in the RunInference request ($REQ_{RI}$). In one or more embodiments, the input data in the RunInference request ($REQ_{RI}$) may be compressed, encoded, and/or encrypted. In one or more embodiments, the RunInference request includes compressed and encoded hand-drawn pictures. Specifically, the compression consists of encoding the values of each eight-pixel block from the input image as a single 8-bit character. The encoding uses the Base-64 standard for transmitting binary text via the HTTP Protocol.

The HTM server 29 feeds the input data received from the client device 22 to the HTM network 69, which generates a belief vector. The HTM server 29 then sends this belief vector in a response $RES_{RI}$ from the HTM server 29 to the client device 22. In one or more embodiments, the belief vector of the response $RES_{RI}$ includes a belief distribution indicating probabilities or likelihoods that the input data corresponds to instances of the categories learned by the HTM network. In this embodiment, the initial GetCategoryInfo response from the HTM server includes a canonical drawing that represents each category.

The client device 22 maps S714 the belief vector to the categories as identified in the category information included in the response $RES_{GCI}$. Then the client device 22 performs a useful action based on the inferred category of the input data.

Image Recognition Example

Figure 8:
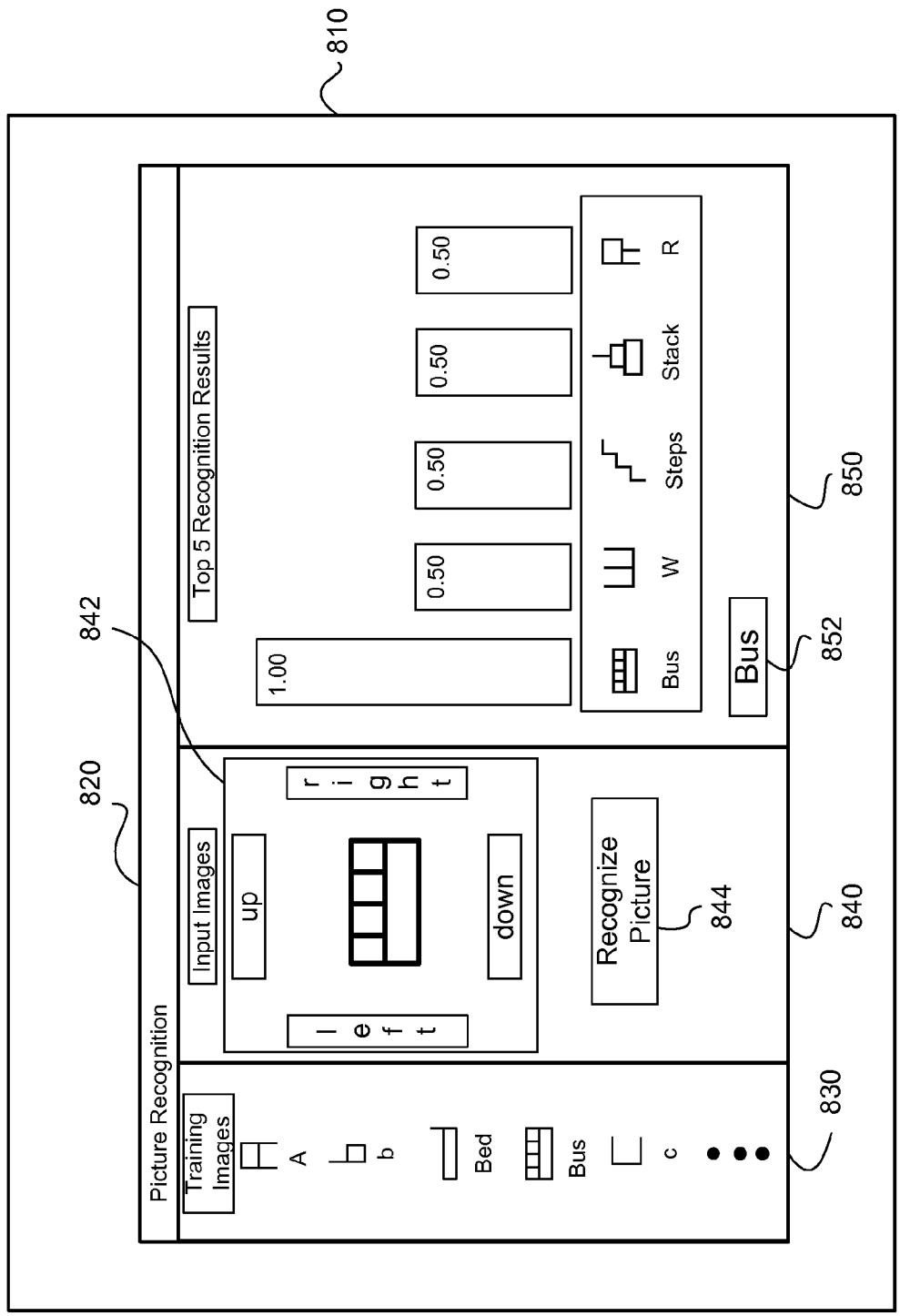
FIG. 8 is a screen shot illustrating a screen of a client device 22 displaying a result of the inference, according to one embodiment.

FIG. 8 is a screen shot illustrating a screen 810 of a client device 22 displaying a result of the inference, according to one embodiment. In the example of FIG. 8, the client device 22 sends black and white images as input data to the remote server 24. In response, the remote server 24 sends a belief vector representing the likelihood that the object in the image is an instance of the learned categories (objects).

In this example, a window 820 associated with the web-based HTM system 20 includes three sections. The left section 830 of the window displays the images (or icons) learned by the HTM network. The images (or icons) in the left section 830 are received from the HTM server 29 in a $RES_{GCI}$ response from the HTM server 29, and displayed in the window 820. The middle section 840 of the window 820 displays the image 842 submitted for recognition in the current session. By pressing a 'recognize picture' icon 844 in this section, the input image 842 is submitted to the remote server 24.

The right section 850 of the window 820 displays the result of the inference performed at the HTM network 69. In the example of FIG. 8, the HTM network 69 returned a score (probability) of 1.00 for 'Bus' and 0.50 for other four categories ('W', 'Steps', 'Stack' and 'R'). The highest score is for 'Bus,' and thus, 'bus' is indicated in a box 852 as being the most likely match. The layout illustrated in FIG. 8 is merely illustrative and various other alternatives may also be used for the same or different applications.

Alternative Embodiments

In one or more embodiment, it is desirable to customize the network to the needs of each client. Therefore, multiple client devices act independently of each other and submit training samples that are not collectively shared with other client devices' data but instead are used to train HTM networks associated with a single client, or a subset of clients. In such embodiments, separate HTM networks may be maintained for each client device and/or subset of client devices.

In one embodiment, the training of the HTM network 69 is performed using only the sample input data provided by client devices 22, and the HTM network 69 is not pre-trained using separate sample input data and supervisory signals. In certain applications, separate sets of sample input data are not available to train the HTM network 69. In such applications, the HTM network 69 may rely solely on the input data from the client devices 22 to train the HTM network 69.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A server system comprising a processor and a memory device, the server system comprising:
a gateway server configured to receive via a communication network requests to perform temporal processing on input data sets from a plurality of client devices, the gateway server further configured to receive each of the input data set from each of the plurality of client devices via the communication network; and
a temporal memory server coupled to the gateway server to receive the input data sets from the gateway server, the temporal memory server configured to perform temporal processing on each of the input data sets by at least detecting temporal sequences of spatial inputs in each of the input data sets.

2. The server system of claim 1, wherein the gateway server comprises:
a Hypertext Transfer Protocol (HTTP) server configured to establish connections with the plurality of client devices in response to connection requests from the plurality of client devices; and
a scripting module configured to invoke handler scripts to extract the input data sets associated with the connection requests, the scripting module providing the extracted input data sets to the temporal memory server for the temporal processing.

3. The server system of claim 1, wherein the temporal memory server comprises a plurality of processing nodes structured in a hierarchical manner.

4. The server system of claim 3, wherein the temporal memory server comprises:
a first node for receiving the input data sets and generating a first vector representing information about temporal sequences of spatial patterns in the input data sets corresponding to learned sequences of spatial patterns; and
a second node associated with the first node to generate and output a second vector based on the first vector, the second vector representing information about causes of the input data sets.

5. The server system of claim 1, wherein the temporal memory server comprises a pre-processor module for pre-processing the input data sets before the temporal processing.

6. The server system of claim 1, wherein the temporal memory server is trained at least partially by samples of input data sets and a supervisory signal received from the plurality of client devices via the gateway server.

7. The server system of claim 1, wherein the temporal processing comprises inference and classification.

8. The server system of claim 1, wherein the temporal memory server is configured to form a model of temporal sequences of spatial patterns in all of the input data sets received from the plurality of client devices.

9. The server system of claim 1, wherein the temporal memory server is configured to generate distinct models of temporal sequences of spatial patterns in each of the input data sets received from each of the plurality of client devices.

10. The server system of claim 1, wherein the gateway server and the temporal memory server are implemented on separate computing devices.

11. A client device, comprising:
a sensor for generating input data including patterns and sequences;
a process manager comprising a processor and configured to generate a request to perform inference or classification to a remote server, the process manager coupled to the sensor to format the input data and associate the input data with the request, the processor manager further configured to receive an output from the remote server that perform temporal processing on the input data responsive to sending the request and the input data to the remote server; and
a communication module coupled to the process manager for transmitting the request and the associated input data to the remote server and receiving the output from the remote server via a communication network.

12. The client device of claim 11, further comprising a pre-processor coupled to the sensor and the processor manager for pre-processing the input data for processing at the remote server.

13. The client device of claim 11, further comprising a category mapper coupled to the process manager for storing mapping between indices in the output received from the remote server and causes to the input data learned by the remote server, the indices received from the remote server responsive to sending the input data.

14. The client device of claim 11, wherein the communication module transmits the input data and receives the output from the remote server by TCP/IP and HTTP.

15. The client device of claim 11, wherein the process manager stores identification for identifying the client device.

16. The client device of claim 11, wherein the sensor comprises a software component for processing data received at or stored in the client device.

17. A computer-implemented method of processing input data, comprising:

receiving, at a computing device located remotely from a plurality of client devices, via a communication network the input data sets from the plurality of client devices;

receiving requests to perform temporal processing on the input data sets from the plurality of client devices performing temporal processing on each of the input data sets by at least detecting temporal sequences of spatial inputs in each of the input data sets;

generating an output representing result of the temporal processing; and sending the output to at least one of the plurality of client devices.

18. The method of claim 17, further comprising receiving training information at the computing device for performing the temporal processing.

19. The method of claim 17, further comprising:

storing mapping information representing mapping between causes learned by the computing device using the training information and indices associated with causes, the output comprising the indices.

20. The method of claim 17, wherein the input data sets and the output is communicated using TCP/IP and HTTP protocols via the communication network.

* * * * *